US006967752B1

(12) United States Patent  
Katakura

(10) Patent No.: US 6,967,752 B1
(45) Date of Patent: Nov. 22, 2005

(54) IMAGE READING APPARATUS AND METHOD

(75) Inventor: Kazuhiko Katakura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 957 days.

(21) Appl. No.: 09/667,605

(22) Filed: Sep. 22, 2000

(30) Foreign Application Priority Data

Sep. 22, 1999 (JP) .................................. 11-268050

(51) Int. Cl.[7] .......................... H04N 1/46; H04N 3/02; H04N 5/253; G03F 3/08

(52) U.S. Cl. ...................... 358/518; 358/506; 358/512; 358/515; 358/516; 358/527; 358/487; 358/518; 348/96; 348/97; 348/98

(58) Field of Search ................................ 358/518, 506, 358/512, 515, 516, 487, 527; 348/96, 97, 348/98

(56) References Cited

U.S. PATENT DOCUMENTS

| 5,168,373 | A | * | 12/1992 | Nakamura | .................. 358/406 |
| 5,995,204 | A | * | 11/1999 | Hoshino et al. | ............... 355/75 |
| 6,233,059 | B1 | * | 5/2001 | Kodaira et al. | ............... 358/1.9 |
| 6,289,119 | B1 | * | 9/2001 | Nagata | ........................ 382/162 |
| 6,317,221 | B1 | * | 11/2001 | Aikawa et al. | ............... 358/1.9 |

* cited by examiner

Primary Examiner—Edward Coles
Assistant Examiner—Houshang Safaipour
(74) Attorney, Agent, or Firm—Sughrue Mion, PLLC

(57) ABSTRACT

An image reading apparatus and method in which no complicated control is carried out and suitable adjustment of the color balance can be carried out in accordance with the type of a photographic material. First, the type of a photographic film to be read is acquired. When the photographic film is a negative film or a sepia-tone film, a filter for negative film is set on an optical axis of illumination light. When the photographic film is a positive film or a black-and-white film, a filter for positive film is set on the optical axis of illumination light. In either state, a film image on the photographic film is read.

9 Claims, 17 Drawing Sheets

F I G. 1
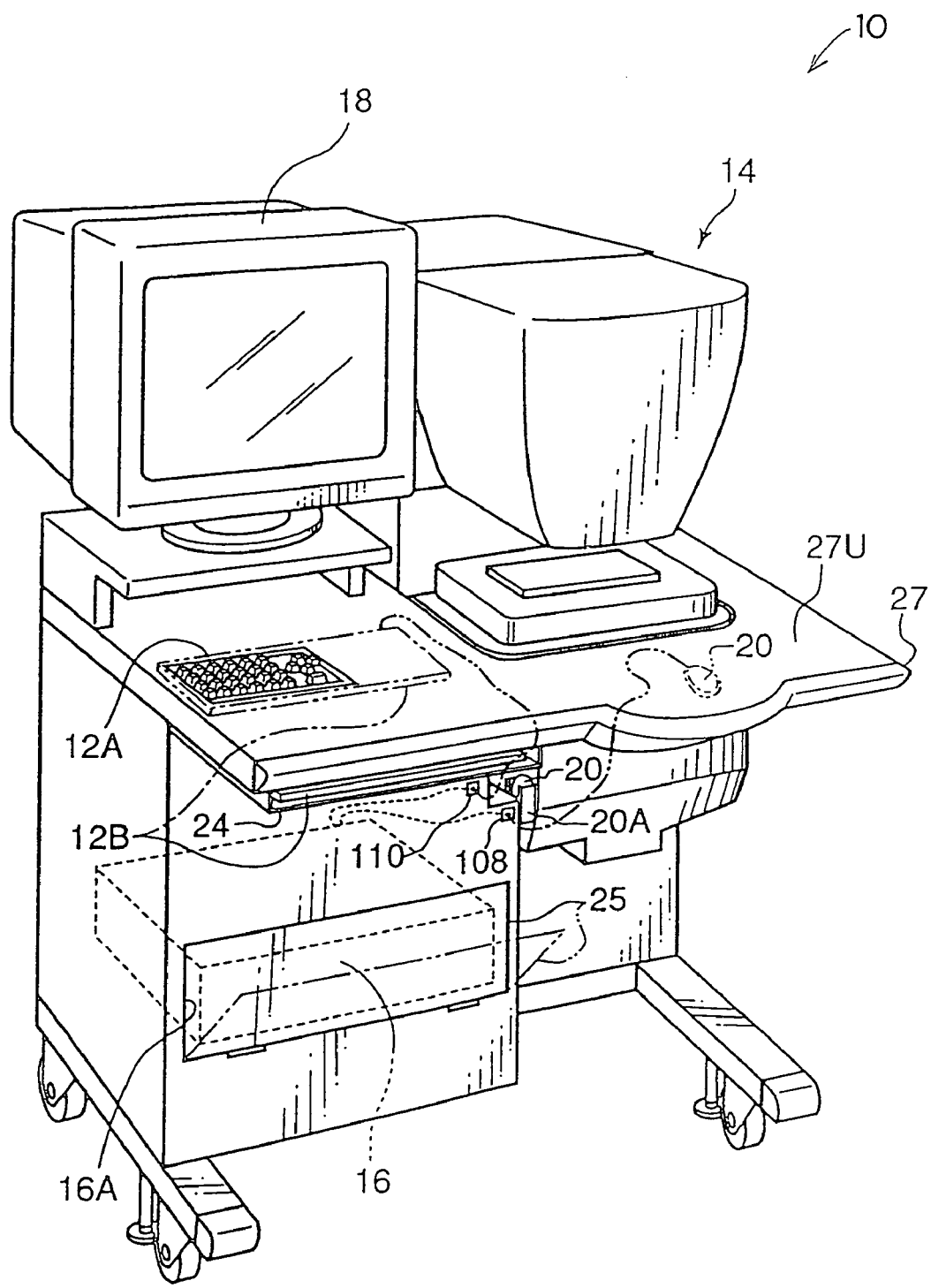

F I G. 1 2
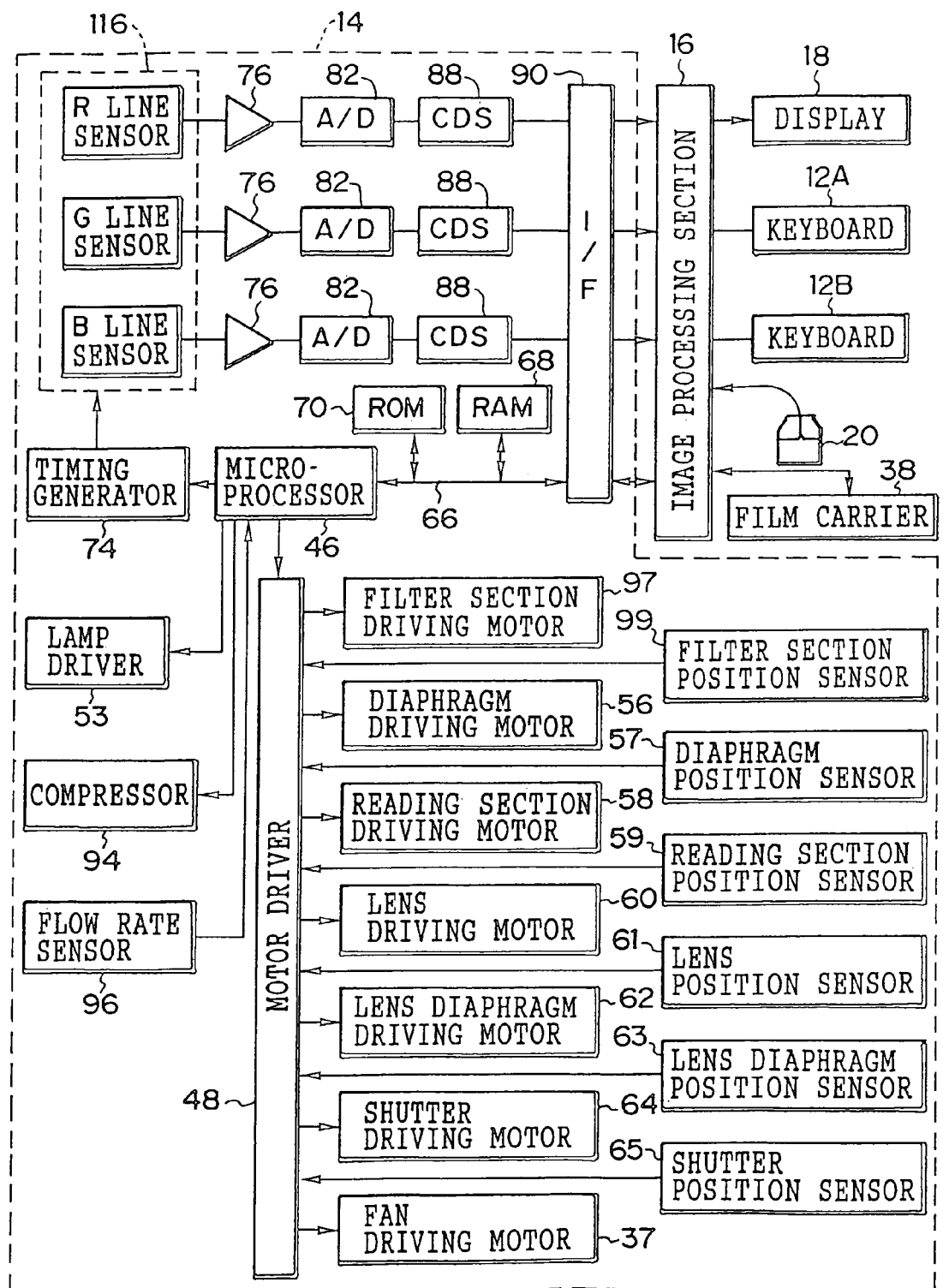

F I G. 1 5 A
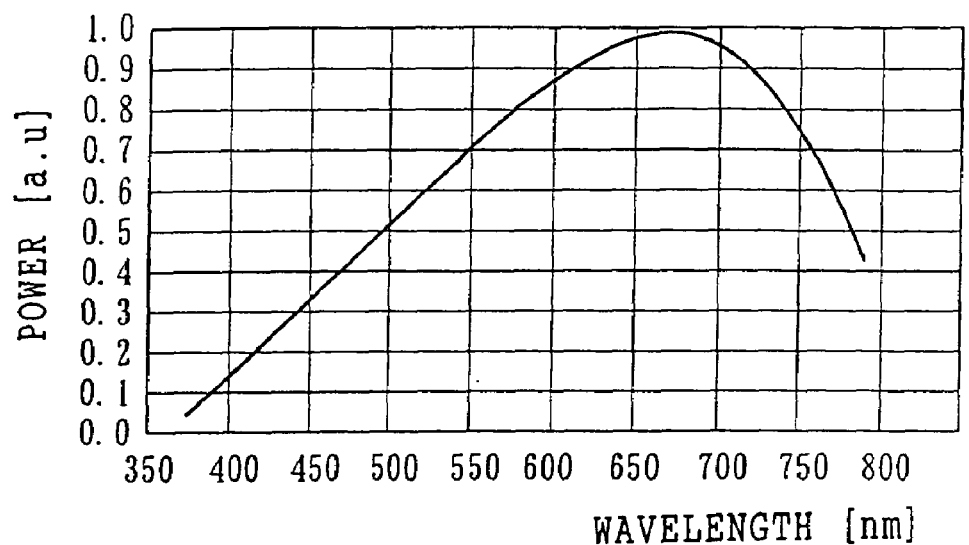
F I G. 1 5 B
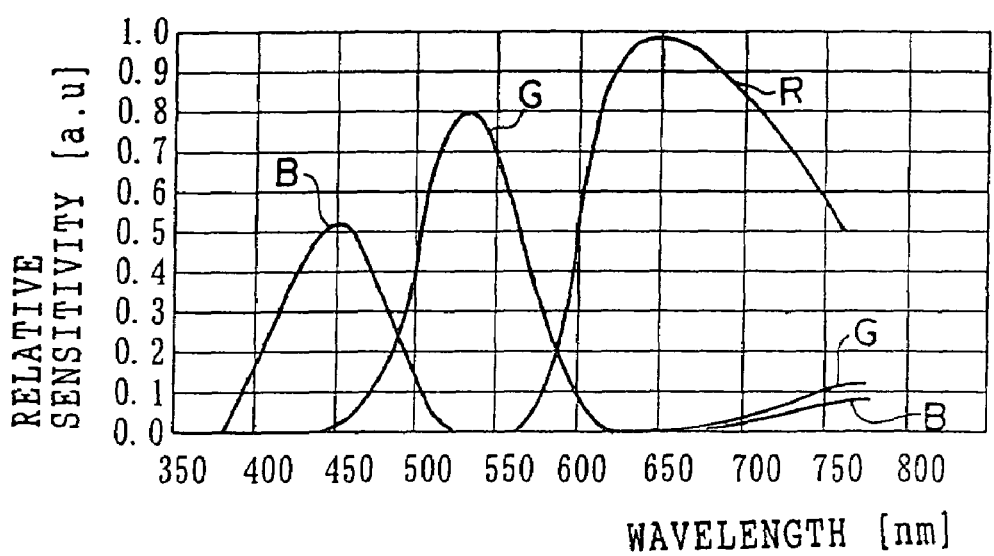

F I G. 1 6 A
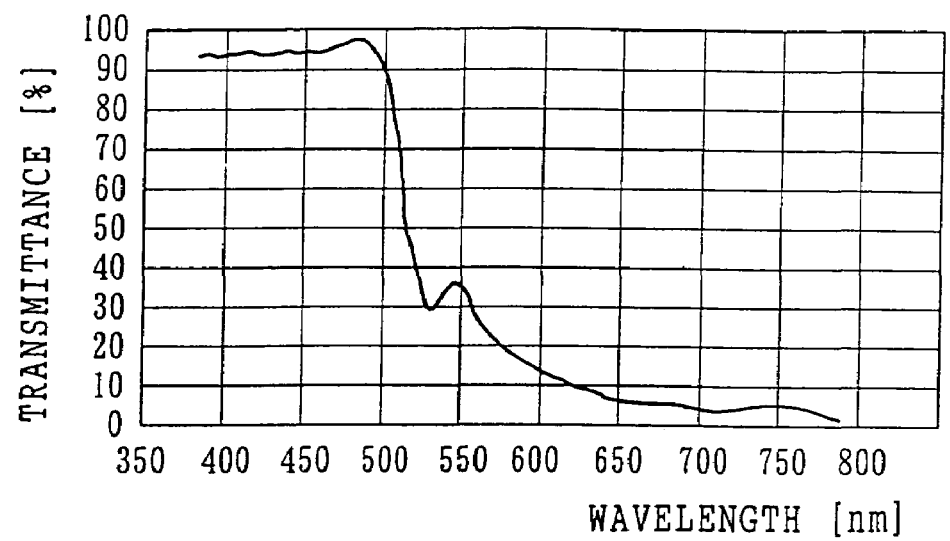
F I G. 1 6 B
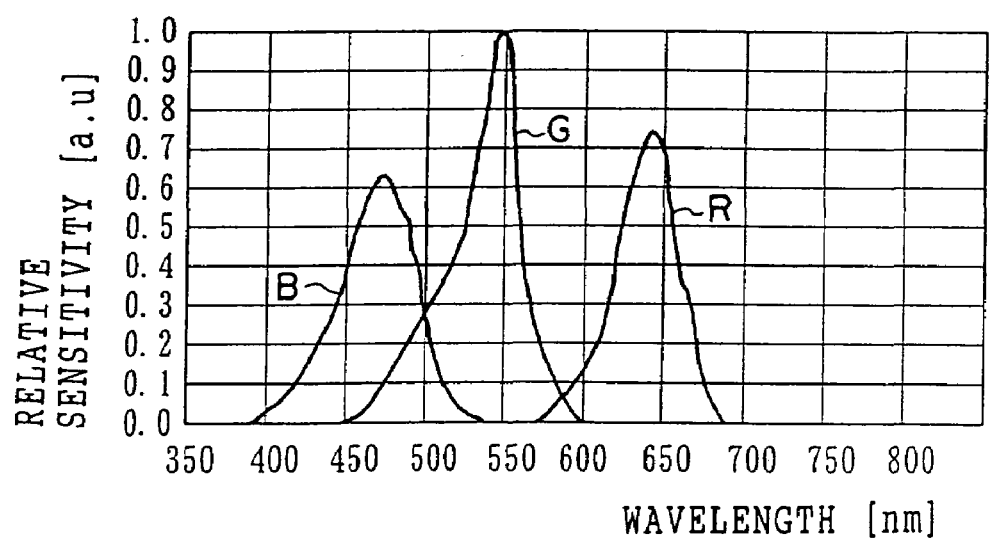

F I G. 1 7 A
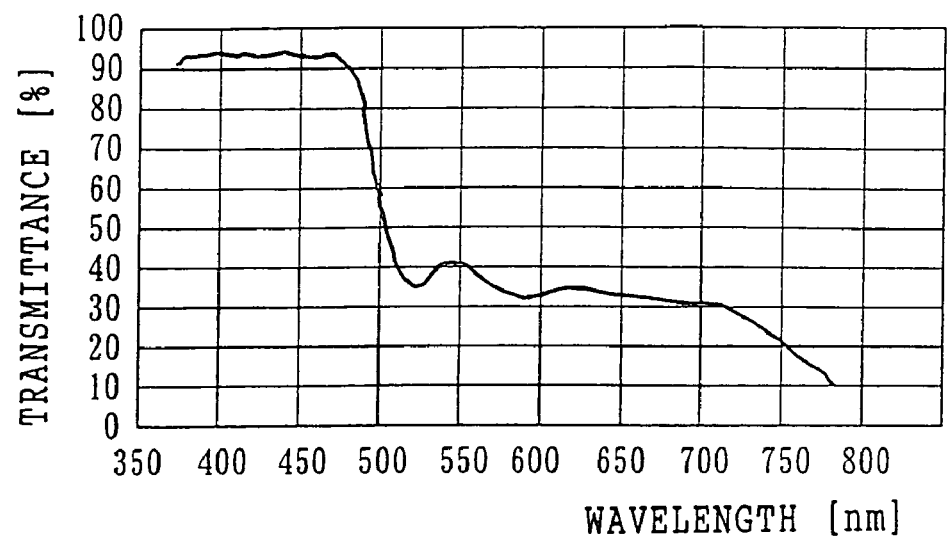
F I G. 1 7 B
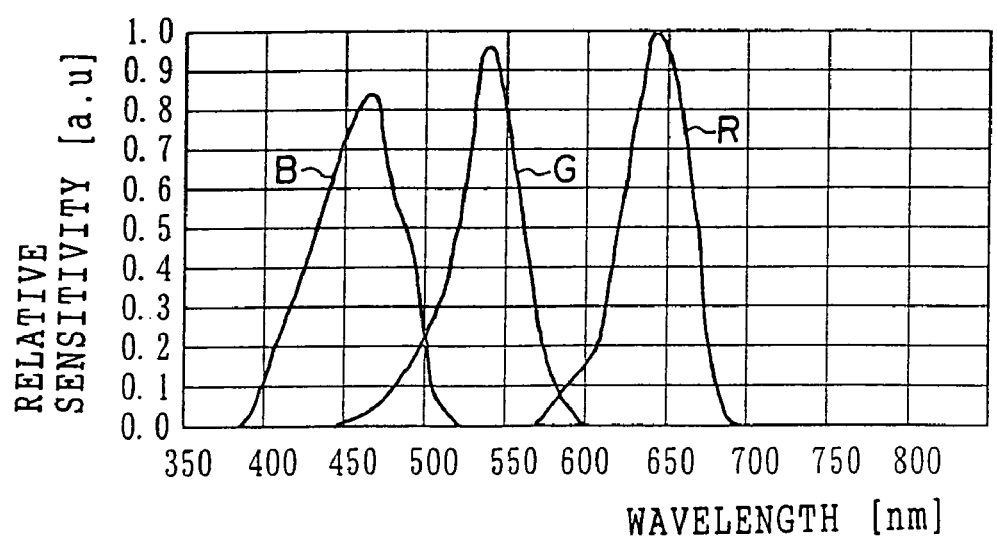

IMAGE READING APPARATUS AND METHOD

BACKGROUND OF THE INVENTION

1. Field of the Invention

The present invention relates to an image reading apparatus and method, and more particularly to an image reading apparatus and method in which a developed photographic material is illuminated and an image recorded on the photographic material is read on the basis of light transmitted therethrough.

2. Description of the Related Art

In recent years, photographic processing methods have been proposed in which a film image recorded on a photographic material such as a developed photographic film (hereinafter referred to simply as a photographic film) is read in such a manner as to be separated into component colors of R, G and B, and image data obtained by reading the film image is subjected to image processings such as various corrections, and thereafter, an image is recorded on a recording material or is shown on a display.

Generally, in an image reading apparatus which is used to read film images in this type of photographic processing method, reading a film image on a photographic film to be read is carried out in such a manner that light is irradiated onto the film image, and light transmitted through the film image is focusd and read as image data of plural pixels by an image sensor such as a linear CCD, an area CCD, or the like, which is provided at an focusing position.

There are various types of photographic films such as negative films on which negative images are recorded, positive films (reversal films) on which positive images are recorded, and the like, and negative films and positive films greatly differ in characteristics. FIG. 14A shows an example of transmittance characteristics of a non-exposed portion of a negative film (i.e., the base of a film), while FIG. 14B shows an example of transmittance characteristics of a non-exposed portion of a positive film. As shown in FIGS. 14A and 14B, in general, the transmittance of the non-exposed portion of a negative film is increased in the order of the wavelength regions of B, G, and R, while the transmittance of the non-exposed portion of a positive film has substantially the same value for the wavelength regions of R, G, and B.

As described above, there is a great difference between the transmittance characteristics of negative films and those of positive films. Therefore, a problem exists in that, if a film image is read without correcting the difference in the transmittance characteristics, the color balance of the film image is lost and a variable range of the charge accumulation time of a CCD is used up, and as a result, color correction cannot be effected. In this case, since the signal-to-noise (S/N) ratio is low, a rough image is formed, or a dull image is formed due to color mixing. In order to realize image reading at a high S/N ratio, it is desired that the number of charges to be accumulated in the CCD be as large as possible (for example, 60% or more of saturation when a CCD of 100,000 eV is used) within a range in which no saturation of the charge accumulated in the CCD is generated.

As a technique which can be used to overcome the above problem, a technique is disclosed in Japanese Patent Application Laid-Open (JP-A) No. 6-245062. In this technique, an offset density is respectively given for the reading of R, G, and B when a photographic film is a negative film, and the same offset densities are given for the reading of R, G, and B when the photographic film is a positive film. Based on the offset densities given, adjustment of the amount of insertion of a filter which modulates (adjusts) light for reading, adjustment of the charge accumulation time by the CCD, adjustment of the amplification factor with respect to an output from the CCD, and the like are carried out.

However, in the above technique disclosed in JP-A No. 6-245062, as described above, the offset densities given for the reading of R, G, and B vary in accordance with the type of the photographic film (i.e., a negative film or a positive film). Further, adjustment of respective portions is carried out in accordance with the offset densities given. Therefore, there is a drawback in that control for varying the offset densities and adjustment of the respective portions is complicated.

SUMMARY OF THE INVENTION

In order to overcome the above problems, an object of the present invention is to provide an image reading apparatus and method in which no complicated control is carried out and suitable adjustment of the color balance can be carried out in accordance with the type of photographic material.

In order to achieve the above-described object, in accordance with a first aspect of the present invention, there is provided an image reading apparatus comprising: a light source for emitting light which illuminates a photographic material; an image sensor which reads an image recorded on the photographic material by dividing the image into a plurality of pixels and separating each of the plurality of pixels into a plurality of colors and outputs data of the plurality of colors; acquiring device for acquiring information representing a type of the photographic material; and an optical filter device which is disposed between the light source and the image sensor and sets a color correction (compensation) state of a color balance of transmitted light in accordance with the information representing the type of the photographic material so that outputs for the plurality of colors from the image sensor are substantially equal.

In accordance with the image reading apparatus of the first aspect, information representing the type of the photographic material is acquired by the acquiring device. The optical filter device is disposed between the light source which emits light illuminating the photographic material, and the image sensor which reads an image recorded on the photographic material by dividing the image into plural pixels and separating the respective pixels into the plurality of colors and outputs data of the respective colors. The color correction state of the color balance of transmitted light is set by the optical filter device in accordance with information representing the type of the photographic material so that outputs for the respective colors from the image sensor are substantially equal.

Acquiring information representing the type of the photographic material by the acquiring device refers to automatically reading and identifying the type of the photographic material by a conveying device (i.e., a so-called film carrier) which is used to convey the photographic material to a position where it is illuminated by the light source, identifying the type of the photographic material by the type of the film carrier or the type of a film mask which is mounted onto the film carrier, or identifying information representing the type of the photographic material by an operator of the apparatus directly inputting information representing the type of the photographic material into the apparatus. Further, examples of the image sensor are linear CCDs, area CCDs, and photoelectric conversion elements other than CCDs (for example, MOS sensors or the like).

As described above, according to the image reading apparatus of the first aspect, the color correction state of the color balance of transmitted light is set by the optical filter device, which is disposed between the light source and the image sensor, in accordance with information representing the type of the photographic material so that the outputs for the respective colors from the image sensor are substantially equal. Therefore, complicated control such as adjustment of the amount of insertion of the filter which adjusts light for reading, adjustment of the charge accumulation time by the CCD, and adjustment of the amplification factor with respect to an output from the CCD in accordance with offset densities which are set for respective types of photographic materials not necessary, and suitable adjustment of the color balance in accordance with the type of the photographic material can be easily carried out.

Further, besides being applicable to an image reading apparatus in which an image is read solely by a visible light, the present invention can also be applied to an image reading apparatus having a function in which, by using image read by a visible light and image read by an invisible light, portions corresponding to scratches or the like formed on the image recording area of the photographic material are not included in the image data obtained by reading the image (this function is a so-called film scratch eliminating function).

As in a second aspect of the present invention, the optical filter device of the image reading apparatus in the first aspect sets plural color correction states in accordance with the characteristic of the photographic material. In this case, the optical filter device sets color correction states which are different for the respective types of the photographic material to be read. Further, when photographic materials which are different in type but similar in characteristics are present, the optical filter device can set a common color correction state for the photographic materials having similar characteristics. In the case that the optical filter device sets color correction states which are different for the respective types of the photographic material to be read, it is necessary to prepare optical filters which correspond to the respective types of the photographic materials, and therefore, the size of the optical filter device may become large and the cost may increase. However, since an optical color correction state which is optimum for the characteristics of each type of the photographic film can be set. If a common color correction state is set, the number of the color correction states can be made less than the number of the types of the photographic material. Accordingly, comparing with a case in which each color correction state is set for each type of the photographic material, control for setting the color correction states can be simplified.

For example, the types of the photographic materials include negative and positive films, sepia-tone film for sepia-tone printing, black-and-white film for black-and-white printing, and the like. In general, sepia-tone film has transmittance characteristics similar to those of negative film, since colorants similar to those used for negative film are used for sepia-tone film. The base color of black-and-white film is blue, and black-and-white film has transmittance characteristics similar to those of positive film.

Accordingly, in accordance with a third aspect of the present invention, there is provided an image reading apparatus according to the second aspect, wherein the plural color correction states include a first color correction state corresponding to the photographic material which is one of a negative film or a sepia-tone film, and a second color correction state corresponding to the photographic material which is one of a positive film or a black-and-white film.

As described above, according to the image reading apparatus of the third aspect, effects similar to those of the invention of the first aspect can be obtained. Further, in the invention of the second aspect, the plural color correction states include the first color correction state in which the photographic material is a negative film or a sepia-tone film, and the second color correction state in which the photographic material is a positive film or a black-and-white film. Thus, instead of a different color correction states being used for each of the photographic materials having similar characteristics (for example, a negative film and a sepia-tone film), the same color correction state can be used. Accordingly, compared with a case in which each color correction state is set for each type of the photographic material, the cost required for the apparatus can be reduced, and control for adjusting the color balance can be simplified.

In accordance with a fourth aspect of the present invention, there is provided an image reading apparatus according to the second or third aspect, wherein the optical filter device includes plural types of optical filters, and each of the plural color correction states is set by using respective plural types of the optical filters.

According to the image reading apparatus of the fourth aspect, the optical filter device in the invention of the second or third aspect includes plural types of optical filters, and each of the plural color correction states in the invention of the second or third aspect is set by using each of the plural types of the optical filters. In this way, each of the color correction states is set by a single optical filter.

In accordance with a fifth aspect of the present invention, there is provided an image reading apparatus according to the second or third aspect, wherein the optical filter device includes plural types of optical filters, and a one color correction state among the plural color correction states is set by using a one optical filter among the plural types of optical filters and each of other color correction states (other than the one color correction state) is set by using the one optical filter and respective other optical filters (other than the one optical filter) among the plural types of optical filters in combination.

According to the image reading apparatus of the fifth aspect, the optical filter device in the invention of the second or third aspect includes plural types of optical filters, and a one color correction state among the plural color correction states is set by using a one optical filter among the plural types of optical filters and each of other color correction states other than the one color correction state is set by using the one optical filter and respective optical filters among the plural types of optical filters in combination. In this way, a particular (the one) color correction state is set by a single filter, while the remaining color correction states are set by plural optical filters.

As described above, according to the image reading apparatus of the fifth aspect, effects similar to those of the invention of the second or third aspect can be obtained. Further, the particular color correction state among the plural color correction states is set by singly using a particular (the one) optical filter among the plural optical filters, and the particular optical filter among the plural optical filters and each of the remaining optical filters are used in combination such that each of the remaining color correction states, which corresponds to each of the remaining filters respectively combined with the particular optical filter, is set. Thus, control for adjustment of the color balance can be simplified by fixing the particular optical filter on the optical axis and disposing each of the remaining optical filters on the optical axis when each of the remaining color correction states is set.

Further, as in the image reading apparatus of a sixth aspect, the image reading apparatus of the second or third aspect can also be realized by the optical filter device including plural types of optical filters and by setting each of the plural color correction states by using plural optical filters in combination.

According to the image reading apparatus of the sixth aspect, the optical filter device of the invention of the second or third aspect includes plural types of optical filters and sets each of the plural color correction states by using plural optical filters among the plural types of optical filters in combination.

In this way, according to the image reading apparatus of the sixth aspect, effects similar to those of the invention of the second or third aspect can be obtained. Further, each of the plural color correction states is set by using plural optical filters in combination. Accordingly, the number of the optical filters can be made less than the number of the color correction states. Moreover, the cost required for the apparatus can be reduced, and the optical filter device can be made small.

In accordance with a seventh aspect of the present invention, there is provided an image reading apparatus according to any of the first to sixth aspects, wherein the optical filter device is disposed between the photographic material and the image sensor and in such a manner as to be closer to the image sensor than to the photographic material.

According to the image reading apparatus of the seventh aspect, the optical filter device of the image reading apparatus in any of the first to sixth aspects is disposed between the photographic material and the image sensor and in such a manner as to be close to the image sensor.

As described above, according to the image reading apparatus of the seventh aspect, effects similar to those of the invention of the first to sixth aspects can be obtained. Further, since the optical filter device is disposed between the photographic material and the image sensor and in such a manner as to be close to the image sensor, the optical filter device can be made small, thereby reducing costs and saving space.

In accordance with an eighth aspect of the present invention, there is provided an image reading apparatus according to any of the first to sixth aspects, wherein the optical filter device is disposed between the light source and the photographic material.

According to the image reading apparatus of the eighth aspect, the optical filter device of the image reading apparatus in any of the first to sixth aspects is disposed between the light source and the photographic material.

As described above, according to the image reading apparatus of the eighth aspect, effects similar to those of the invention of the first to sixth aspects can be obtained. Further, since the optical filter device is disposed between the light source and the photographic material, unnecessary light can be prevented from being irradiated onto the photographic material. As a result, generation of problems such as color fading or deterioration of the photographic material can be prevented.

A preferred example of first and second color correction states of the invention in the third to eighth aspects will now be described.

As shown in FIG. 15A which illustrates a spectral distribution of a light source, in general, power in the respective wavelengths of R, G and B is not substantially the same. As shown in FIG. 15B, with respect to the relative sensitivity of an image sensor, the wavelength region are generally different for each of the component colors of R, G and B. FIG. 15A shows an example of a spectral distribution of a light source which is a halogen lamp, while FIG. 15B shows an example of relative sensitivity characteristics of an image sensor which is a CCD sensor. In general, as described above, transmittance of a non-exposed portion of a negative film increases in the order of light having the wavelength region of B, light having the wavelength region of G and light having the wavelength region of R. As for transmittance of a non-exposed portion of a positive film, light having the wavelength regions of R, G and B has substantially the same value (see FIGS. 14A and 14B).

As shown in FIG. 16A as an example, in the first color correction state for negative film or sepia-tone film in the present invention, transmittance of light having the wavelength region of B is higher than those of light having other wavelength regions, and transmittance of light having the wavelength region of R is considerably lower than that of light having the wavelength region of B. In this way, an overall spectral characteristic for negative film such as the one shown in FIG. 16B can be formed.

Further, as shown in FIG. 17A as an example, in the second color correction state for positive film or black-and-white film, transmittance of light having the wavelength region of B is higher than those of light having other wavelength regions, and transmittances of light having the wavelength regions of G and R are about ⅓ of that of light having the wavelength region of B. In this way, there can be formed an overall spectral characteristic for positive film such as the one shown in FIG. 17B, and which has characteristics substantially similar to those of the overall spectral characteristic for negative film.

In accordance with a ninth aspect of the present invention, there is provided an image reading apparatus according to any of the first to eighth aspects, wherein the acquiring device acquires the information representing the type of the photographic material based on one of information recorded on the photographic material and the results of the reading of a non-exposed portion of the photographic material by the image sensor.

According to the image reading apparatus of the ninth aspect, information recorded on the photographic material can be acquired by the acquiring device of the image reading apparatus in any of the first to eighth aspects, or information representing the type of the photographic material can be acquired based on the results of the reading of the non-exposed portion of the photographic material by the image sensor (i.e., based on an output from the image sensor). Examples of information recorded on the photographic material include DX codes, magnetic information, optical information, and mechanical information (notches or the like).

In this way, according to the image reading apparatus of the ninth aspect, effects similar to those of the invention in any of the first to eighth aspects can be obtained. Further, information recorded on the photographic material can be acquired by the acquiring device of the invention in any of the first to eighth aspects, or information representing the type of the photographic material can be acquired based on the results of the reading of the non-exposed portion of the photographic material by the image sensor (i.e., based on an output from the image sensor). Therefore, information can be automatically acquired, and labor can be saved as compared with a case in which information is inputted by an operator or the like.

In accordance with a tenth aspect of the present invention, there is provided an image reading method in which a color balance of light incident on an image sensor, which reads an image recorded on a photographic material by dividing the image into a plurality of pixels and separating each of the plurality of pixels into a plurality of colors and outputs data of the plurality of colors, is adjusted in accordance with information representing a type of the photographic material so that outputs for the plurality of colors from the image sensor are substantially equal regardless of the type of the photographic material.

According to the image reading method of the tenth aspect, the color balance of light incident on the image sensor is adjusted in accordance with the information representing the type of the photographic material, so that outputs for the respective colors from the image sensor, which reads an image recorded on the photographic material by dividing the image into plural pixels, separating the respective pixels into the plurality of colors, and outputting data of the plurality of colors, are substantially equal regardless of the type of the photographic material. Thus, as in the invention of the first aspect, complicated control such as setting an offset density for each type of the photographic material and carrying out, in accordance with the offset density, adjustment of the amount of insertion of the filter which adjusts light for reading, adjustment of the charge accumulation time by the CCD, and adjustment of the amplification factor with respect to an output from the CCD is not necessary, and suitable adjustment of the color balance in accordance with the type of the photographic material can be easily carried out.

BRIEF DESCRIPTION OF THE DRAWINGS

FIG. 1 is an outside view of an image reading apparatus according to embodiments of the present invention.

FIG. 12 is a block diagram showing a schematic structure of an electric system of a linear CCD scanner of the image reading apparatus according to the second embodiment.

FIG. 15A is a graph showing an example of a spectral distribution of a light source which is a halogen lamp.

FIG. 15B is a graph showing an example of relative sensitivity characteristics of an image sensor which is a CCD sensor.

FIG. 16A is a graph showing an example of transmittance characteristics of a color balance filter for negative films.

FIG. 16B is a graph showing an example of the overall spectral characteristic when the color balance filter having the transmittance characteristics shown in FIG. 16A is used.

FIG. 17A is a graph showing transmittance characteristics of a color balance filter for positive films.

FIG. 17B is a graph showing an example of the overall spectral characteristic when the color balance filter having the transmittance characteristics shown in FIG. 17A is used.

DESCRIPTION OF THE PREFERRED EMBODIMENTS

Figure 2:
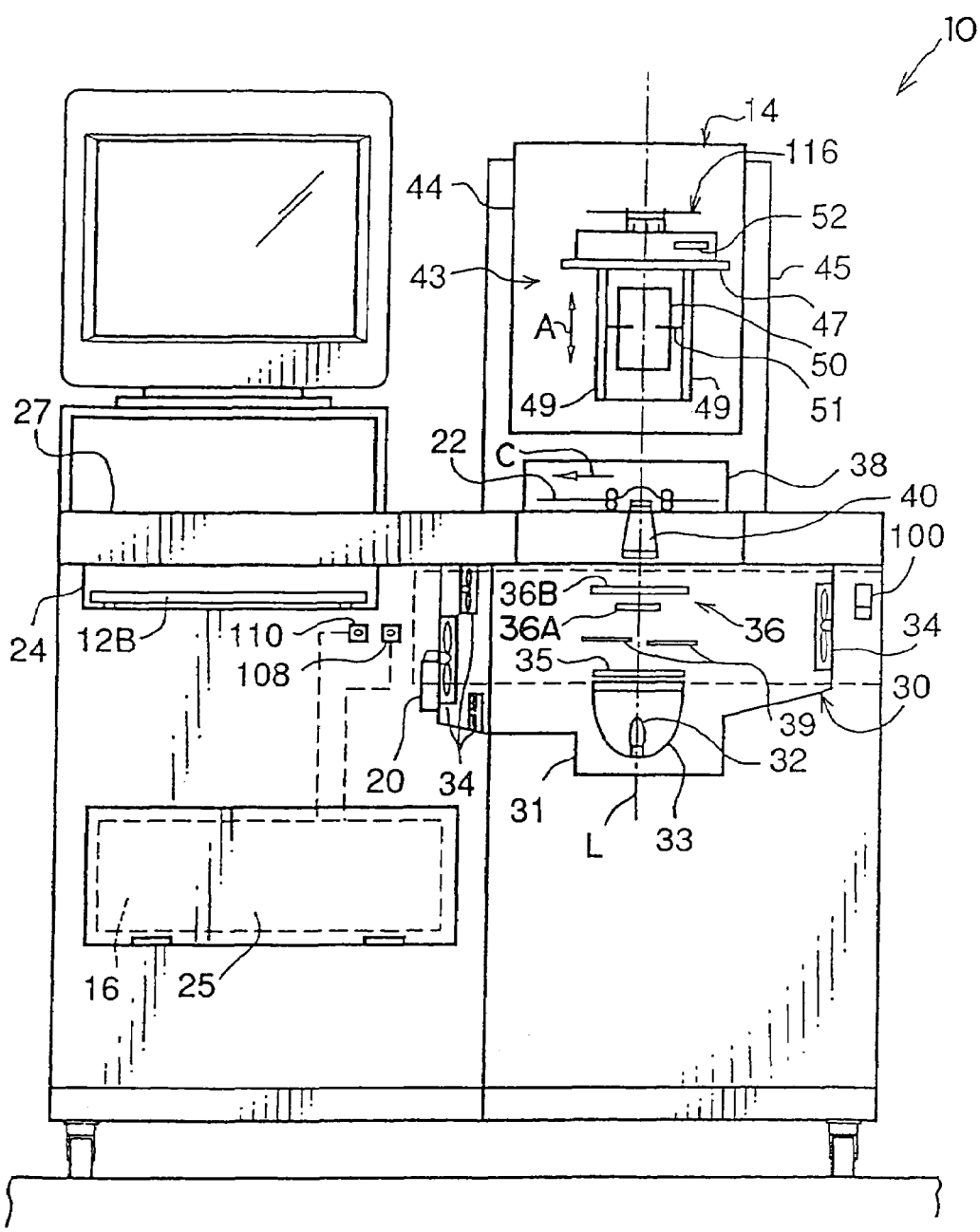
FIG. 2 is a front sectional view of an optical system of the image reading apparatus according to a first embodiment.

Referring now to the drawings, embodiments of the present invention will be hereinafter described in detail.

First Embodiment

As shown in FIG. 1, an image reading apparatus 10 in accordance with a first embodiment of the present invention includes a linear CCD scanner 14. The linear CCD scanner 14 is provided at a work table 27, which is equipped with an image processing section 16, a mouse 20, two types of keyboards 12A and 12B, and a display 18.

One of the keyboards, the keyboard 12A, is embedded in a work surface 27U of the work table 27. When not in use, the other keyboard, the keyboard 12B, is accommodated in a drawer 24 of the work table 27, and when in use, the keyboard 12B is taken out of the drawer 24 and is laid on the keyboard 12A. At this time, the cord of the keyboard 12B is connected to a jack 110 which is connected to the image processing section 16.

The cord of the mouse 20 is connected through a hole 108, which is provided at the work table 27, to the image processing section 16. When not in use, the mouse 20 is accommodated within a mouse holder 20A, and when in use, the mouse 20 is taken out of the mouse holder 20A and is placed on the work surface 27U.

The image processing section 16 is accommodated in an accommodating portion 16A provided at the work table 27, and a door 25 of the accommodating portion 16A is usually closed. The image processing section 16 can be taken out of the accommodating portion 16A by opening the door 25.

The linear CCD scanner 14 is used to read a film image recorded on a photographic film such as a negative film or a positive film. Examples of photographic films whose images can be read include 135-size photographic films, 110-size photographic films, photographic films with a transparent magnetic layer formed thereon (i.e., 240-size photographic films which are so-called APS films), and 120-size and 220-size (Brownie size) photographic films. The linear CCD scanner 14 reads the film image to be read, as described above, by a linear CCD and outputs image data.

The image processing section 16 is structured to allow input of image data outputted from the linear CCD scanner 14. Further, the image processing section 16 carries out image processings including various corrections on the inputted image data and then outputs the corrected image data, as image data for recording, to an unillustrated laser printer section.

Figure 3:
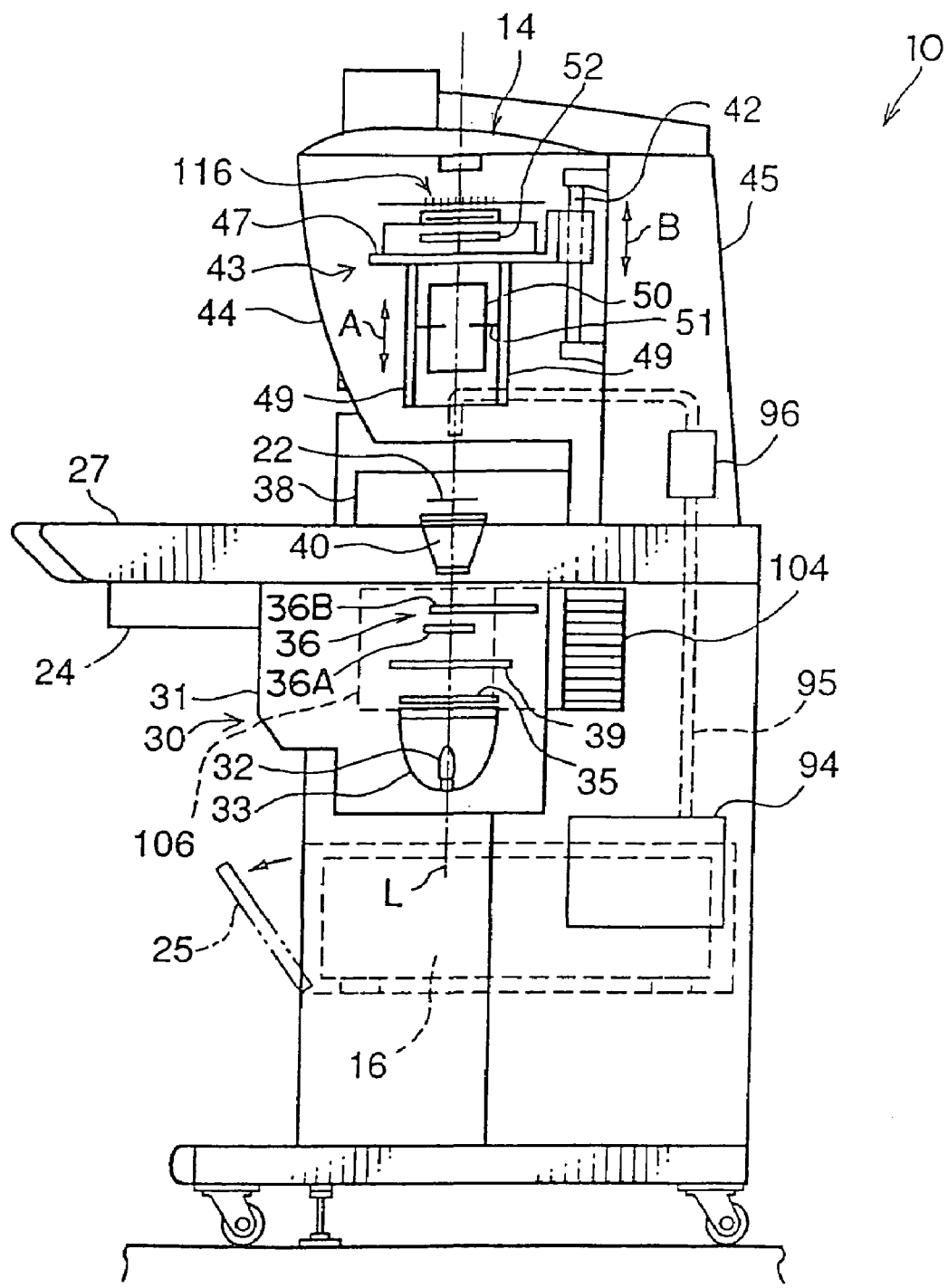
FIG. 3 is a side sectional view of the optical system of the image reading apparatus according to the first embodiment.

As shown in FIGS. 2 and 3, an optical system of the linear CCD scanner 14 includes a light source section 30 disposed below the work table 27, a diffusion box 40 supported by the work table 27, a film carrier 38 set on the work table 27, and a reading section 43 disposed at the side of the work table 27 opposite to the side at which the light source section 30 is disposed.

The light source section 30 is accommodated within a metallic casing 31. A lamp 32, which is a halogen lamp, is disposed within the casing 31.

A reflector 33 is provided at the periphery of the lamp 32, and a portion of light emitted from the lamp 32 is reflected by the reflector 33 and irradiated in a fixed direction. A plurality of fans 34 are provided on the sides of the reflector 33. The fans 34 are operated when the lamp 32 is turned on, so as to prevent overheating of the interior of the casing 31.

A UV/IR cutting filter 35, a diaphragm 39, and a filter section 36 are sequentially provided on the light emission side of the reflector 33 along an optical axis L of light reflected by the reflector 33. The UV/IR cutting filter 35 cuts light having wavelengths in the ultraviolet and infrared regions and so prevents chemical reactions and an increase in the temperature of the photographic film 22, such that high reading accuracy is ensured. The diaphragm 39 adjusts the amount of light emitted from the lamp 32 and the reflector 33. The filter section 36 adjusts the color balance of the light which reaches the photographic film 22 and a section 43 according to the type of the photographic film 22, so that the outputs for the respective colors by the linear CCD 116 are substantially equal regardless of the type of the photographic film 22 (a negative film, a positive film, a sepia-tone film, a black-and-white film, or the like).

Figure 4A:
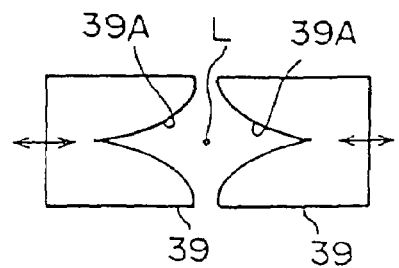
FIG. 4A is a plan view showing an example of a diaphragm.
Figure 4B:
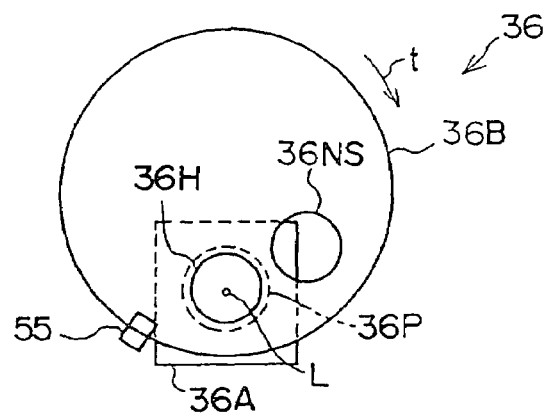
FIG. 4B is a plan view showing an example of a filter section according to the first embodiment.

As shown in FIG. 4B, the filter section 36 includes a frame 36A and a turret 36B. A color balance filter 36P for positive films, which has filter characteristics suitable for positive films, is fitted into the frame 36A. The turret 36B has an opening 36H which has substantially the same shape and dimensions as those of the color balance filter 36P. Further, a differential color balance filter 36NS, which can form filter characteristics suitable for negative films by being superposed on the color balance filter 36P on the optical axis L, is fitted into the turret 36B.

The frame 36A is fixed so that the center of the color balance filter 36P substantially coincides with the optical axis L. By the center of the opening 36H of the turret 36B substantially coinciding with the optical axis L, a state that only the color balance filter 36P suitable for positive films is disposed on the optical axis L can be formed, and by the center of the differential color balance filter 36NS of the turret 36B substantially coinciding with the optical axis L, a state can be formed which is equivalent to a state in which a filter having filter characteristics suitable for negative films is disposed on the optical axis L. The filter characteristics suitable for negative films and the filter characteristics of the color balance filter 36P which are suitable for positive films in the present embodiment are transmittance characteristics shown in FIGS. 16A and 17A, respectively.

The photographic film 22 corresponds to the photographic material in the aspects of the present invention. Further, the color balance filter 36P corresponds to one of the remaining optical filters according to the fifth aspect of the present invention, while the differential color balance filter 36NS corresponds to the particular (the one) optical filter according to the fifth aspect of the present invention. The filter section 36 corresponds to the optical filter device of the present invention.

The diaphragm 39 is formed by a pair of plate-like members with the optical axis L interposed therebetween, and is provided to move slidably so that the pair of the plate-like members move toward and away from each other. As shown in FIG. 4A, the pair of plate-like members of the diaphragm 39 each has a notch 39A formed at one end of the plate-like member such that, from the one end toward the other end in the direction in which the diaphragm 39 is slid, the cross-sectional area (opened portion) of the plate-like member along the direction perpendicular to the sliding direction continuously varies. These plate-like members are disposed in such a manner that the sides thereof with the notches 39A formed therein face each other.

In the above-described structure, either of the filter 36P or filters 36P and 36NS is/are disposed on the optical axis L in accordance with the type of the photographic film so as to form light having desired light components. The amount of light passing through the diaphragm 39 is adjusted to a desired amount of light by the position of the diaphragm 39 (positions of the plate-like member).

The diffusion box 40 is formed in such a manner that, closer to the upper portion thereof (i.e., as the diffusion box 40 grows closer to the photographic film 22), the diffusion box 40 becomes narrower in the direction in which the photographic film 22 is conveyed by the film carrier 38 (see FIG. 2) and becomes wider in the direction perpendicular to the direction in which the photographic film 22 is conveyed (i.e., the transverse direction of the photographic film 22) (see FIG. 3). Further, light diffusion plates (not shown) are mounted on the light-entering side and the light-exiting side of the diffusion box 40, respectively. Although the aforementioned diffusion box 40 is used for a 135-size photographic film, diffusion boxes formed in accordance with shapes of other types of photographic films (not shown) are also prepared.

Light entering the diffusion box 40 is, toward the film carrier 38 (i.e., toward the photographic film 22), made into slit light whose longitudinal direction coincides with the transverse direction of the photographic film 22, and further is made into diffused light by the light diffusion plates and then exits the diffusion box 40. Due to light exiting from the diffusion box 40 being made into diffused light as described above, nonuniformity in the amount of light irradiated onto the photographic film 22 is alleviated, and a uniform amount of slit light is illuminated onto the film image. Further, even when scratches are present on the film image, the scratches are prevented from becoming conspicuous.

A film carrier 38 and a diffusion box 40 are provided for each type of the photographic film 22 and selected in accordance with the type of the photographic film 22.

Elongated openings (not shown) are provided at respective positions of the top surface and the bottom surface of the film carrier 38, which positions correspond to the optical axis L. The openings are designed to be longer than the width of the photographic film 22 in the transverse direction of the photographic film 22. Slit light from the diffusion box 40 is irradiated onto the photographic film 22 through the opening provided in the bottom surface of the film carrier 38, and light transmitted through the photographic film 22 reaches the reading section 43 through the opening provided in the top surface of the film carrier 38.

An unillustrated guide is provided at the film carrier 38 for guiding the photographic film 22 so that the photographic film 22 is curved at a position onto which slit light from the diffusion box 40 is irradiated (i.e., at a reading position). In this way, a flat state of the photographic film 22 is ensured at the reading position.

Further, the diffusion box 40 is supported such that the top surface thereof is near the above-mentioned reading position. Therefore, a cut-out portion is provided at the bottom surface of the film carrier 38 so that the film carrier 38 and the diffusion box 40 do not interfere with each other when the film carrier 38 is loaded.

The film carrier 38 is structured so as to be capable of conveying the photographic film 22 at various speeds in accordance with the density or other conditions of the film image at the time of fine scanning or pre-scanning.

Figure 4C:
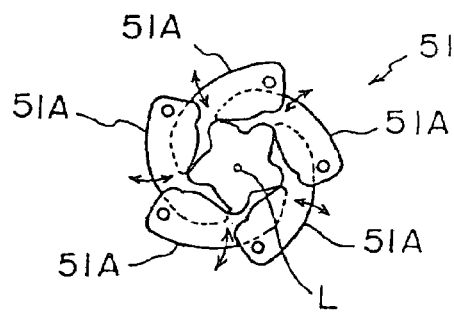
FIG. 4C is a plan view showing an example of a lens diaphragm.

The reading section 43 is accommodated within a casing 44. A loading stand 47, on the upper surface of which a linear CCD 116 is mounted, is provided within the casing 44 and a lens cylinder 49 hang down from the loading stand 47. In order to carry out a change of magnification such as reduction, enlargement or the like, a lens unit 50 is supported inside the lens cylinder 49 in such a manner that the lens unit 50 can be slidably moved in the directions A toward and away from the work table 27. A supporting frame 45 is formed upright on the work table 27. The loading stand 47 is supported by a guide rail 42 mounted to the supporting frame 45 in such a manner as to move slidably in the directions B toward and away from the work table 27 so that a conjugate length can be ensured during the above-mentioned change of magnification or automatic focusing. The lens unit 50 is formed of a plurality of lenses, and an aperture stop (lens diaphragm) 51 is provided among these lenses. As shown in FIG. 4C, the aperture stop 51 includes a plurality of diaphragm plates 51A each having a substantially C-shaped configuration. These diaphragm plates 51A are disposed evenly around the optical axis L and one end portion of each of the diaphragm plates 51A is supported by a pin so that the diaphragm plates 51A are each rotatable around the pin. The plurality of diaphragm plates 51A are connected together via a link (not shown), and when a driving force of a lens diaphragm driving motor (which will be described later) is transmitted to the diaphragm plates 51A, the diaphragm plates 51A rotate in the same direction. Accompanied with the rotation of the diaphragm plates 51A, an area around the optical axis L which is not cut off from light by the diaphragm plates 51A (i.e., a substantially star-shaped area in FIG. 4C) varies and the amount of light transmitted through the aperture stop 51 thereby varies.

The linear CCD 116 is structured in such a manner that a sensing portion, in which a large number of photoelectric conversion elements such as CCD cells or photodiodes is disposed in a row in the transverse direction of the photographic film 22 and an electric shutter mechanism is disposed, is provided in each of three parallel lines which are spaced apart from each other and color separation filters of R, G, and B are respectively mounted on the light-incident side of the sensing portions (i.e., the linear CCD 116 is a so-called three-line color CCD). Further, transfer portions each formed by a plurality of CCD cells are provided in the vicinity of each of the sensing portions so as to correspond to the respective sensing portions. The charge accumulated in each of the CCD cells of each sensing portion is sequentially transferred via the corresponding transfer portion.

Figure 4D:
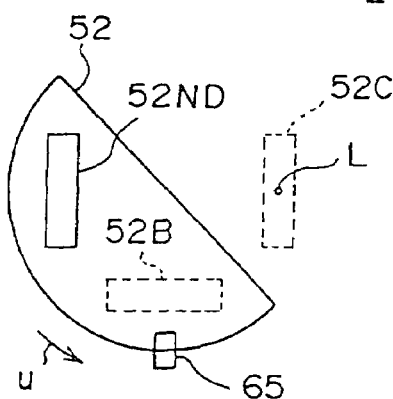
FIG. 4D is a plan view showing an example of a CCD shutter.
Figure 4E:
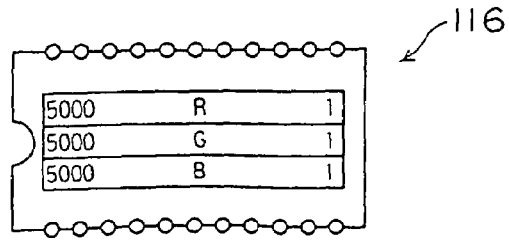
FIG. 4E is a plan view showing an example of a linear CCD.

As shown in FIG. 4E, at the linear CCD 116 in the present embodiment, photoelectric conversion elements for 5000 pixels are respectively provided for R, G, and B.

Further, a CCD shutter 52 is provided on the light-incident side of the linear CCD 116. As shown in FIG. 4D, an ND filter 52ND is fitted into the CCD shutter 52. The CCD shutter 52 is rotated in a direction of arrow u so as to allow switching between a completely closed state in which light otherwise made incident on the linear CCD 116 is blocked for dark correction (i.e., a portion 52B or the like, in which the ND filter 52ND is not fitted of the CCD shutter 52, is positioned at a position 52C including the optical axis L), a completely open state in which light is made incident on the linear CCD 116 for normal reading or bright correction (i.e., the position shown in FIG. 4D), and a reduced light state in which light to be made incident on the linear CCD 116 is decreased by the ND filter 52ND for linearity correction (i.e., the ND filter 52ND is positioned at the position 52C).

As shown in FIG. 3, a compressor 94 is provided at the work table 27. The compressor 94 generates cooling air for cooling the photographic film 22. Cooling air generated by the compressor 94 is guided by a guiding pipe 95 and supplied to an unillustrated reading portion of the film carrier 38. As a result, an area of the photographic film 22 which is positioned at the reading portion can be cooled. The guiding pipe 95 passes through a flow rate sensor 96 which detects the flow rate of cooling air.

Figure 5:
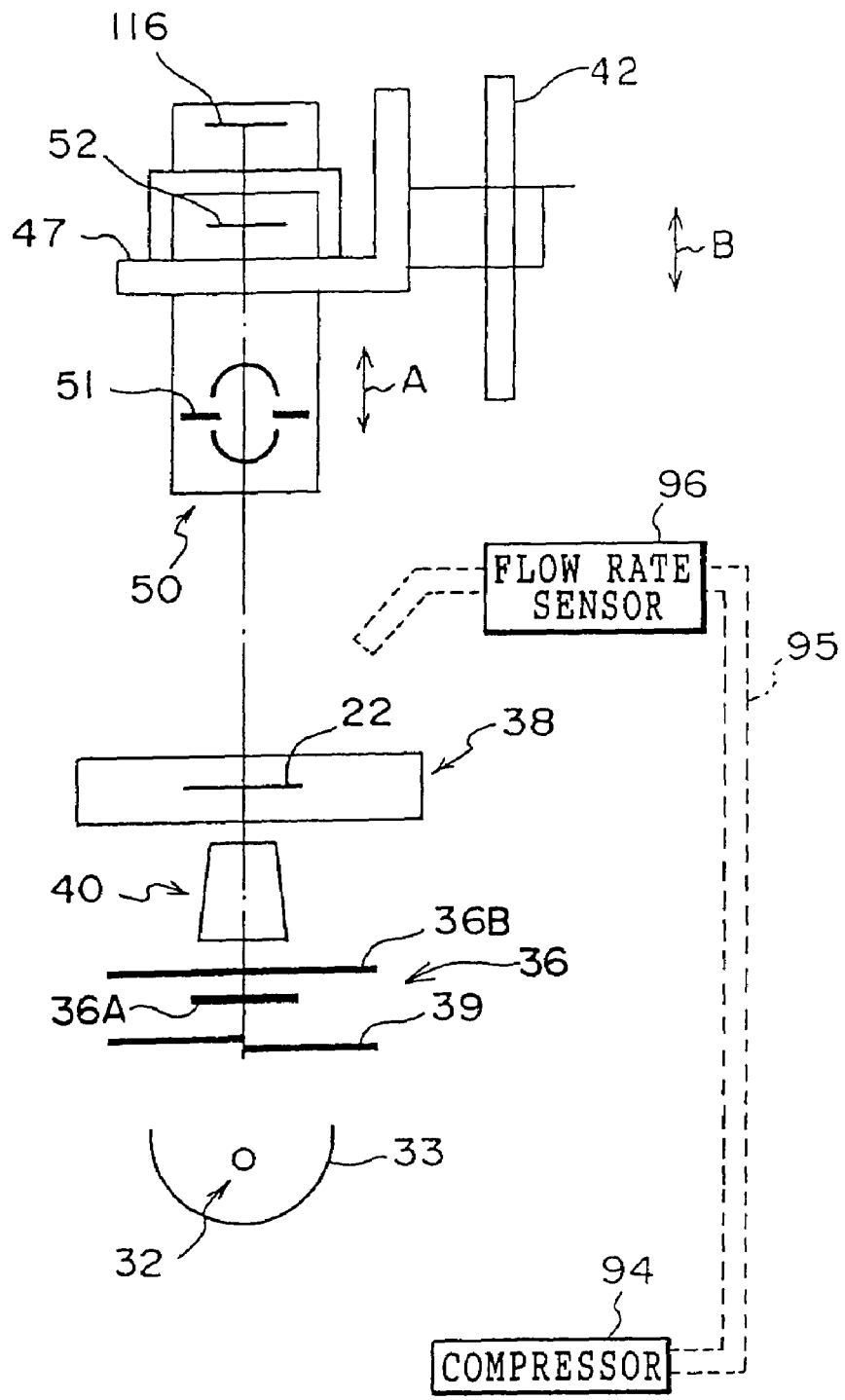
FIG. 5 is a schematic view solely showing a main portion of the optical system of the image reading apparatus according to the first embodiment.
Figure 6:
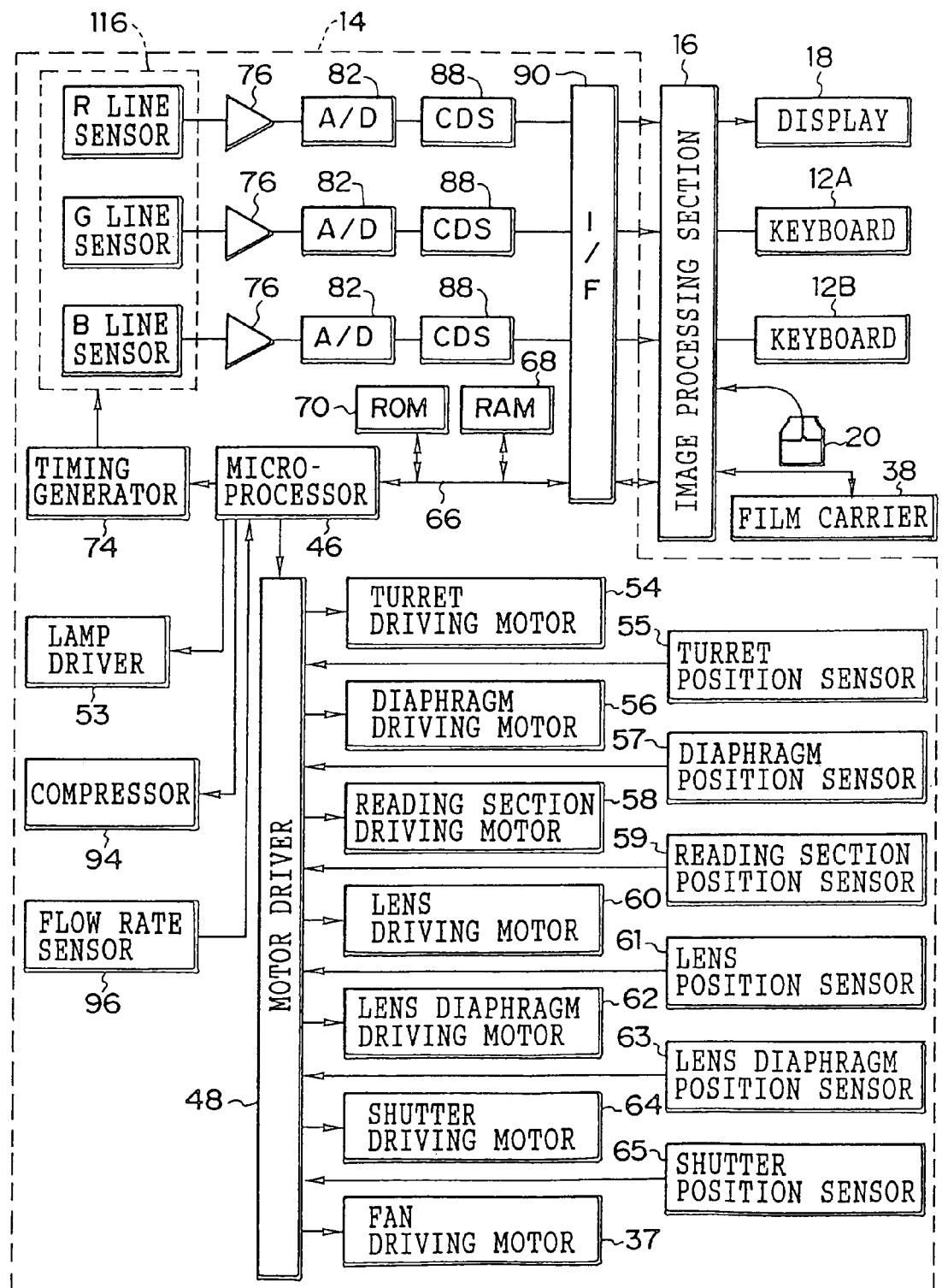
FIG. 6 is a block diagram showing a schematic structure of an electric system of a linear CCD scanner of the image reading apparatus according to the first embodiment.

Referring to a main portion of the optical system of the linear CCD scanner 14 shown in FIG. 5, a schematic structure of an electric system of the linear CCD scanner 14 and the image processing section 16 will be described using FIG. 6.

The linear CCD scanner 14 includes a microprocessor 46 which effects control of the entire linear CCD scanner 14. A RAM 68 (for example, an SRAM), and a ROM 70 (for example, a ROM which can rewrite the stored content) are connected via a bus 66 to the microprocessor 64. Also connected to the microprocessor 64 are a lamp driver 53, the compressor 94, the flow rate sensor 96, and a motor driver 48. The lamp driver 53 turns a lamp 32 on and off in accordance with an instruction from the microprocessor 46. Further, at the time of reading a film image of the photographic film 22, the microprocessor 46 operates the compressor 94 to supply cooling air to the photographic film 22. The flow rate of cooling air is detected by the flow rate sensor 96, and the microprocessor 46 detects, if any, abnormalities.

Moreover, a turret driving motor 54 and a turret position sensor 55 (see FIG. 4B also) are connected to the motor driver 48. The turret driving motor 54 drives to rotate the turret 36B in the direction of arrow t in FIG. 4B so that either of the differential color balance filter 36NS or the opening 36H of the turret 36B in the filter section 36 is positioned on the optical axis L. The turret position sensor 55 detects the base position (an unillustrated notch) of the turret 36B. Also connected to the motor driver 48 are a diaphragm driving motor 56, a diaphragm position sensor 57, a reading-section driving motor 58, a reading-section position sensor 59, a lens driving motor 60, a lens position sensor 61, a lens diaphragm driving motor 62, a lens diaphragm position sensor 63, a shutter driving motor 64, a shutter position sensor 65, and a fan driving motor 37. The diaphragm driving motor 56 allows sliding movement of the diaphragm 39, and the diaphragm position sensor 57 detects the position of the diaphragm 39. The reading-section driving motor 58 allows sliding movement of the loading stand 47 (i.e., the linear CCD 116 and the lens unit 50) along the guide rail 42, and the reading-section position sensor 59 detects the position of the loading stand 47. The lens driving motor 60 allows sliding movement of the lens unit 50 along the lens cylinder 49, and the lens position sensor 61 detects the position of the lens unit 50. The lens diaphragm driving motor 62 allows rotation of the diaphragm plates 51A of the lens diaphragm 51, and the lens diaphragm position sensor 63 detects the position of the lens diaphragm 51 (i.e., the position of the diaphragm plates 51A). The shutter driving motor 64 allows switching between the completely closed state, the completely open state, and the decreased light state of the CCD shutter 52, and the shutter position sensor 65 detects the position of the shutter 52. The fan driving motor 37 drives the fans 34.

During pre-scanning (preliminary reading) and fine scanning (main reading) by the linear CCD 116, based on the respective positions of the turret 36B and the diaphragm 39 which are respectively detected by the turret position sensor 55 and the diaphragm position sensor 57, the microprocessor 46 drives the turret driving motor 54 to rotate the turret 36B and drives the diaphragm driving motor 56 to slidably move the diaphragm 39, thereby allowing adjustment of light irradiated on a film image.

Moreover, the microprocessor 46 determines zoom magnification in accordance with the size of a film image or depending on whether trimming is to be effected, and allows sliding movement of the loading stand 47 by the reading-section driving motor 58 based on the position of the loading stand 47 detected by the reading-section position sensor 59, and allows sliding movement of the lens unit 50 by the lens driving motor 60 based on the position of the lens unit 50 detected by the lens position sensor 61, so that the film image can be read by the linear CCD 116 at the determined zoom magnification.

Further, when focusing control (automatic focusing control) is effected which allows the light receiving surface of the linear CCD 116 to coincide with an focusing position of the film image set by the lens unit 50, the microprocessor 46 allows sliding movement of only the loading stand 47 by the reading-section driving motor 58. The focusing control can be effected so that, for example, the contrast of a film image read by the linear CCD 116 becomes maximum (i.e., a so-called image contrast technique). Alternatively, the focusing control may also be effected based on a distance detected by a distance sensor instead of film-image data, with the distance sensor being provided to measure the distance between the photographic film 22 and the lens unit 50 (or the linear CCD 116) by using infrared radiation or the like.

A timing generator 74 is connected to the linear CCD 116. The timing generator 74 generates various timing signals (clock signals) for operating the linear CCD 116, A/D converters 82, which will be described later, and the like. Signal output terminals of the linear CCD 116 are connected to the A/D converters 82 via amplifiers 76, and the signals outputted from the linear CCD 116 are amplified by the amplifiers 76 and are converted to digital data in the A/D converters 82.

The output terminals of the A/D converters 82 are each connected to the image processing section 16 via a correlated double sampling circuit (CDS) 88 and an interface (I/F) circuit 90 in that order. The CDS 88 respectively samples feed-through data, which indicates the level of a feed-through signal, and pixel data, which indicates the level of a pixel signal, and then subtracts the feed-through data from the pixel data for each pixel. The calculated results (pixel data which accurately corresponds to the amounts of charge accumulated in each of the CCD cells) are sequentially outputted as scan image data to the image processing section 16 via the I/F circuit 90.

Meanwhile, photometric signals of R, G, and B are outputted concurrently (in parallel) from the linear CCD 116, and therefore, three signal processing systems each including the amplifiers 76, the A/D converters 82, and the CDS 88 are provided and image data of R, G, and B are concurrently (in parallel) inputted, as scan image data, to the image processing section 16 from the I/F circuit 90.

Further, the display 18, the keyboards 12A and 12B, the mouse 20, and the film carrier 38, all of which were described above, are also connected to the image processing section 16.

In the microprocessor 46, dark correction and bright correction are carried out on image data of R, G, and B concurrently outputted from the linear CCD scanner 14.

Dark correction is used to cancel dark current, i.e., current flowing within the linear CCD 116 when light is not made incident on the light-entering side of the linear CCD 116. Dark correction is carried out by storing, for each of the cells, data outputted from the linear CCD scanner 14 (i.e., data which represents the dark output level of each of the cells of the sensing portion of the linear CCD 116) in a state in which the light otherwise made incident on the linear CCD 116 is cut off by the CCD shutter 52, and by subtracting the dark output level of a cell corresponding to each pixel from image data outputted from the linear CCD scanner 14 after the photographic film 22 has been read by the linear CCD 116.

Bright correction is used to correct variations in the photoelectric conversion characteristics between cells of the linear CCD 116 and illumination unevenness. In bright correction, in a state in which an original such as the photographic film 22 is not set on the film carrier 38 and only the color balance filter 36P is positioned on the optical axis L in the filter section 36, i.e., a state in which the center of the opening 36H in the turret 36B substantially coincides with the optical axis L, a gain (bright correction data) is set for each of the cells based on image data outputted from the linear CCD scanner 14 after an image has been read by the linear CCD 116 (the variation in density between pixels represented by the image data results from variations in the photoelectric conversion characteristics of the cells and illumination unevenness), and image data of a film image to be read outputted from the linear CCD scanner 14 is corrected for each pixel in accordance with the gain set for each of the cells.

In the image processing section 16, various types of image processings are carried out such as: hypertone processing for carrying out gradation conversion and density conversion, and compressing the gradation of the super-low frequency brightness components of the image; hypersharpness processing for enhancing the sharpness while suppressing graininess; and the like.

The lamp 32 and the linear CCD 116 correspond to the light source and the image sensor of the present invention, respectively.

Next, referring to the flowchart in FIG. 7, a processing for reading an image on the photographic film 22, which is carried out by the microprocessor 46 of the linear CCD scanner 14, will be described as the operation of the present embodiment.

As modes at the time of reading the photographic film 22, a "pre-scanning mode" and a "fine scanning mode" are predetermined for the linear CCD scanner 14. Further, the conditions of the respective portions of the linear CCD scanner 14 in the respective modes are also predetermined. In the present embodiment, a case is described in which there are four types of the photographic film 22 to be read, i.e., a negative film, a positive film, a sepia-tone film, and a black-and-white film. Moreover, in the present embodiment, a case is described in which, before the image reading processing is carried out, the turret 36B in the filter section 36 is positioned such that the center of the opening 36H substantially coincides with the optical axis L.

Figure 7:
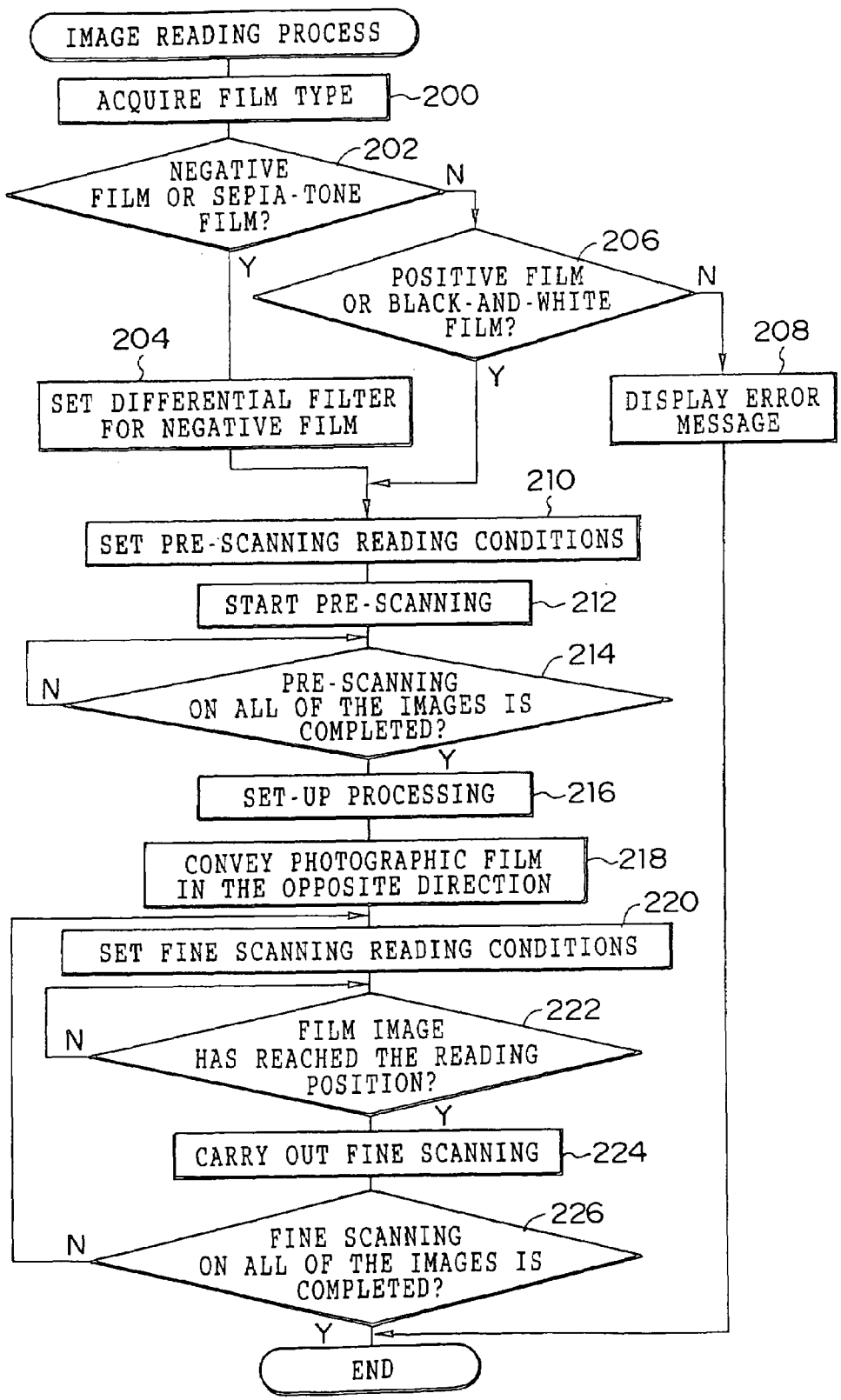
FIG. 7 is a schematic flowchart of an image reading processing executed by a microprocessor of the linear CCD scanner in the first embodiment.

In step 200 of FIG. 7, a DX code recorded on the photographic film 22 is read, and the type of the photographic film 22 is acquired based on the DX code.

In a subsequent step 202, it is determined whether the type of the photographic film 22 acquired in step 200 a film which is one of is a negative film or a sepia-tone film or a film other than the film which is one of is a negative film or a sepia-tone film. When it is determined that the photographic film 22 is a negative film or a sepia-tone film (i.e., when the determination is affirmative), the process proceeds to step 204, where the turret 36B is rotated by the turret driving motor 54 to a position for a negative film (i.e., a position where the center of the differential color balance filter 36NS substantially coincides with the optical axis L) so that the filter section 36 is set to form the filter characteristics suitable for negative films. The process then proceeds to step 210.

On the other hand, when it is determined in step 202 that the photographic film 22 is not a negative film nor a sepia-tone film (i.e., when the determination is negative), the process proceeds to step 206, where it is determined whether the type of the photographic film 22 acquired in the previous step 200 is a film which is one of a positive film or a black-and-white film. When it is determined that the photographic film 22 is a positive film or a black-and-white film (i.e., when the determination is affirmative), the process proceeds to step 210 without step 204 being carried out. Therefore, in this case, only the color balance filter 36P suitable for positive film is positioned on the optical axis L at the filter section 36. In this way, the filter section 36 can be set so as to have the filter characteristics suitable for positive film.

Namely, by processings in steps 200, 202, 204 and 206, the filter section 36 is set so as to have the filter characteristics suitable for negative film when the photographic film 22 whose image is to be read is either a negative film or a sepia-tone film, and the filter section 36 is set so as to have the filter characteristics suitable for positive film when the photographic film 22 is either a positive film or a black-and-white film.

When it is determined in step 206 that the photographic film 22 is not a positive film nor a black-and-white film (i.e., when the determination in step 206 is negative), it is regarded that the photographic film 22 is a type which cannot be read by the image reading apparatus of the present embodiment. The process proceeds to step 208 where an error message is displayed on the display 18, and subsequently, the image reading processing ends.

In step 210, the reading mode of the photographic film 22 is set to the "pre-scanning mode", and operation of the respective portions of the linear CCD scanner 14 is controlled in accordance with the predetermined conditions thereof in the "pre-scanning mode" so that pre-scanning can be carried out on the photographic film 22 under the predetermined reading conditions.

In other words, the lamp 32 is turned on by the lamp driver 53. The diaphragm 39 is moved by the diaphragm driving motor 56 to a position for pre-scanning. The loading stand 47 and the lens unit 50 are slidingly moved by the reading section driving motor 58 and the lens driving motor 60, respectively, so that the zoom magnification by the lens unit 50 becomes a magnification for reading. The lens diaphragm 51 is moved by the lens diaphragm driving motor 62 to its full-open position, and the CCD shutter 52 is moved by the shutter driving motor 64 to its full-open position.

Further, the timing generator 74 is set at "t" which is the shortest operating time of the electronic shutter of the linear CCD 116 (a reading cycle in which a line is read by the linear CCD 116 (i.e., charge accumulation time)). The film carrier 38 is set at "5×v" which is the fastest conveying speed of the photographic film 22 (i.e., the conveying speed which is five times faster than a normal speed ("v") at which a film image is conveyed at the time of fine scanning). Accordingly, pre-scanning is carried out on the photographic film 22 at a high speed and at a relatively low resolution, and is thus completed briefly.

In a subsequent step 212, pre-scanning is started. An instruction is given to the film carrier 38 to convey the photographic film 22 in a predetermined direction (i.e., in a direction of arrow C in FIG. 2). The photographic film 22 which is conveyed at the fastest conveying speed ("5×v") is read by the linear CCD 116 at the shortest reading cycle ("t"). Signals outputted from the linear CCD 116 are sequentially subjected to A/D conversion, and are further subjected to dark correction and bright correction. Then, corrected signals are sequentially outputted as pre-scanning data to the image processing section 16.

In step 214, it is determined whether pre-scanning has been carried out on all the film images on the photographic film 22. The process is placed in a stand-by state until the decision of step 214 becomes affirmative.

During this pre-scanning, in the image processing section 16, image data inputted from the linear CCD scanner 14 is successively stored in an unillustrated storage section. When a predetermined amount of image data has been stored, edge positions of film images, which images have been recorded on the photographic film 22, at both ends along the direction in which the photographic film 22 is conveyed (i.e., upstream and downstream sides of the film image) are respectively determined based on the stored image data.

As proposed by the present inventor in JP-A Nos. 8-304932, 8-304933, 8-304934 and 8-304935, edge positions can, for example, be determined in the following manner. Based on respective density values of pixels represented by pre-scanning data, a density variation value along the longitudinal direction of the photographic film 22 is calculated for each of the pixels. Subsequently, the density variation value of each pixel along the longitudinal direction of the photographic film 22 is integrated per line unit along the transverse direction of the photographic film 22, and integrated values for the respective lines are compared. If the photographic film 22 is an APS film, the time required for the determination of edge positions can be shortened by setting, as a searching range, a region which extends from a position where a perforation is formed to a position where edges may be present, and by searching edges within the searching range.

Moreover, in the image processing section 16, based on the edge positions determined in the above manner, the frame position of the film image is determined, corresponding to the positions of the perforations or the like, and the determined frame position is stored in the above-mentioned unillustrated storage section. Further, based on the frame position, image data of the region in which the film image is recorded is cut out from the image data which has been heretofore stored, and is stored in the above unillustrated storage section.

When pre-scanning is carried out to the end of the photographic film 22 (i.e., when the determination in step 214 in FIG. 7 becomes affirmative), in step 216, predetermined image characteristic amounts of the film image are calculated from the pre-scanning image data stored in the unillustrated storage section by the image processing section 16 at the time of pre-scanning. The predetermined image characteristic amounts include a color balance value of the film image (specifically, the ratio of the minimum density value (the maximum brightness value) for each of the component colors of the film image).

Further, in step 216, based on the calculated image characteristic amounts, processing conditions for image processing with respect to fine-scan image data are set by calculation and properties of the film image (e.g., size, density).

When the photographic film 22 to be read is a 135-size photographic film, the size (in this case, the frame size) of the film image can be determined based on whether or not the density and hue of predetermined portions (e.g., in the case of a film image of standard size, the predetermined portions exist within the image recording range, and in the case of a film image of non-standard size, predetermined portions exist outside the image recording range) are the density and hue which correspond to unexposed portions (in the case of a negative film, the non-exposed portions).

Moreover, the size of the film image (the aspect ratio thereof) can be determined as disclosed in JP-A Nos. 8-304932, 8-304933, 8-304934 and 8-304935. Namely, based on respective density values of the pixels represented by pre-scanning image data, a density variation value along the transverse direction of the film is calculated for each of the pixels, the density variation values along the transverse direction of the film calculated for each of the pixels are integrated per line unit along the longitudinal direction of the film, and the integrated values respectively obtained for the lines are compared to determine the size of the film image (aspect ratio). Alternatively, the size of the film image may be determined based on an image abundance ratio in respective regions of the image after a threshold has been set from a density histogram and the image has been digitalized. The size of the film image may also be determined based on the average value and dispersion of density variation values in the above-mentioned predetermined portions. Further, the size of the film may also be determined by using a combination of the above methods.

Further, when the photographic film 22 to be read is an APS film, the size of the film image (in this case, the print size) can be determined by reading the print size magnetically recorded as data on a magnetic layer of the APS film.

The density type of the film image can be classified into low density, normal density, high density, extra-high density, and the like, by comparing, for example, average density, maximum density, minimum density, and the like, with a predetermined value. Moreover, as the processing conditions for image processing, there are calculated, for example, an enlargement/reduction ratio of an image, a processing condition for image processing such as hypertone and hypersharpness (specifically, the condensation (compression) of gradation to an extra-low frequency brightness component of an image, a gain (rate of highlight) to a high-frequency component or an intermediate frequency component of an image), a gradation conversion condition, and the like.

After setting the type of the film image and the processing conditions for image processing in the above-described manner is completed for all the frame images, in a subsequent step 218, an instruction is given to the film carrier 38 to convey the photographic film 22 in a direction opposite to the predetermined direction (i.e., in a direction opposite to the direction of arrow C in FIG. 2) so that fine scanning of the film image is carried out.

In step 220, operation of the respective portions of the linear CCD scanner 14 is controlled such that fine scanning is carried out on the film image under the reading conditions suitable for the type of the film image to be fine scanned.

Namely, first, the type of the film image to be fine scanned (in this case, the film image which first arrives at the reading position by the photographic film 22 being conveyed in the direction opposite to the predetermined direction) is introduced and determined, and the fine scanning mode is set in accordance with the type of the film image. For example, if the type of the film image is a "high density frame", operation of the respective portions is controlled in accordance with the state of the respective portions predetermined as the fine scanning mode for a high density frame.

In other words, the lamp 32 is turned on, and the diaphragm 39 is moved to a position for fine scanning of a high density frame. The loading stand 47 and the lens unit 50 are slidably moved so that the zoom magnification by the lens unit 50 becomes a magnification for reading. The lens diaphragm 51 and the CCD shutter 52 are respectively moved to their full-open positions.

The timing generator 74 is set at "t" which is the operating time (reading cycle) of the electronic shutter of the linear CCD 116, while the film carrier 38 is set at "v" which is the conveying speed of the photographic film 22. A high density film image has a small amount of transmitted light. In order to accurately read the high density film image in a high dynamic range, the position of the diaphragm 39 at the time of fine scanning a high density frame is a substantially full-open position.

In a subsequent step 222, based on the frame position which is stored in the unillustrated storage section of the image processing section 16 at the time of pre-scanning, it is determined whether the edge of the film image to be fine scanned has arrived at the reading position (i.e., the position of the optical axis) of the linear CCD 116, and the process is placed in a stand-by state until the decision becomes affirmative. When the determination in step 222 becomes affirmative, the process proceeds to step 224, where fine scanning is carried out. In fine scanning, the film image which has arrived at the reading position is read by the linear CCD 116, and the signals outputted from the linear CCD 116 are successively subjected to A/D conversion and are successively outputted as fine-scan image data to the image processing section 16. In this way, fine scanning is carried out on the film image under the reading conditions suitable for each type of the film image.

Fine-scan image data outputted from the linear CCD scanner 14 to the image processing section 16 is subjected to image processing in the image processing section 16 under the processing conditions which have been previously calculated and stored therein, and is outputted to an unillustrated laser printer section or outputted, as an image file, to the outside.

When fine scanning on a single film image is completed, the process proceeds to step 226, where it is determined whether fine scanning has been carried out on all the film images recorded on the photographic film 22 to be read. When the determination is negative, the process returns to step 220, and steps 220, 222, 224 and 226 are repeated. In these steps 220, 222, 224 and 226, fine scanning is carried out on each of the film images under the reading conditions suitable for the type of each of the film images recorded on the photographic film 22 to be read. When the determination in step 226 becomes affirmative, the image reading processing is completed.

As described above in detail, in the image reading apparatus according to the present embodiment, the color balance of light made incident on the linear CCD is adjusted in accordance with information which represents the type of the photographic film, in such a manner that by the filter section disposed between the lamp and the linear CCD the color balance of transmitted light is adjusted so that the outputs for the respective colors from the linear CCD are substantially equal regardless of the type of the photographic film. Therefore, complicated control such as setting an offset density for each type of the photographic film and adjusting the respective portions in accordance with the offset density is not necessary, and suitable adjustment of the color balance in accordance with the type of the photographic film can be easily carried out.

Further, in the image reading apparatus according to the present embodiment, the filter section includes the differential color balance filter for adjusting the color balance when the photographic film is a negative film or a sepia-tone film, and the color balance filter for adjusting the color balance when the photographic film is a positive film or a black-and-white film. Namely, one filter is commonly used for the photographic films having similar characteristics. Thus, compared with a case in which a filter is used for each type of the photographic film, the cost required for the apparatus can be reduced. Moreover, control for adjusting the color balance can be simplified.

Furthermore, in the image reading apparatus according to the present embodiment, information representing the type of the photographic film is automatically acquired based on a DX code provided at the photographic film. Accordingly, labor can be saved as compared with a case in which the type of the photographic film is inputted by an operator or the like.

Moreover, in the image reading apparatus according to the present embodiment, a halogen lamp is used as the light source, and a filter fixed on the optical axis is a color balance filter which corresponds to positive film. Therefore, variations in the wavelengths of R, G and B of illumination light, which are caused by the halogen lamp, can be made small.

In the image reading apparatus according to the present embodiment, the color balance filter which corresponds to positive film is fixed on the optical axis, and the filter characteristics for negative film are formed by the differential color balance filter being disposed onto the optical axis as occasion demands. Accordingly, control for forming the filter characteristics for positive film can be simplified.

Further, in the image reading apparatus according to the present embodiment, the filter section is disposed between the lamp and the photographic film. Thus, unnecessary light can be prevented from being irradiated onto the photographic film. As a result, generation of problems such as color fading or deterioration of the photographic film can be prevented.

In the first embodiment, a case has been described in which a halogen lamp is used as the light source of the present invention. However, the present invention is not limited to this structure. For example, a metal halide lamp can be used as the light source. In this case, it is preferable that the color balance filter corresponding to negative film is disposed on the optical axis in a fixed manner, and, as the differential color balance filter provided at the turret 36B, a filter is used which can form filter characteristics suitable for positive film by being superposed on the color balance filter corresponding to negative film on the optical axis.

Figure 8A:
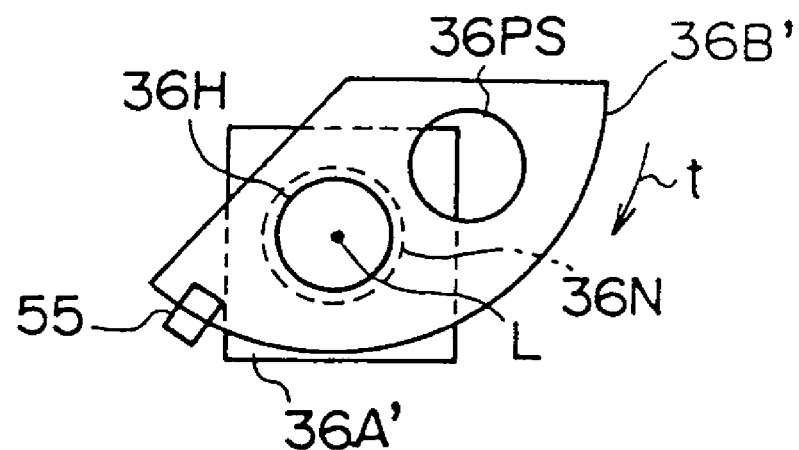
FIG. 8A is a plan view showing another configuration of the filter section according to the first embodiment.

Further, in the first embodiment, a case has been described in which the color balance filter 36P is fixed on the optical axis and filter group for negative film is formed by disposing the differential color balance filter 36NS on the optical axis only when a film image on a negative film or a sepia-tone film is read. However, the present invention is not limited to the same. For example, as shown in FIG. 8A, the filter section may include a frame 36A' into which the color balance filter 36N having the filter characteristics suitable for negative film is fitted, and a turret 36B' (fan-shaped in the plan view in the example shown in FIG. 8A) in which an opening 36H having substantially the same shape and dimensions as those of the color balance filter 36N is formed, and into which is fitted a differential color balance filter 36PS which can form the filter characteristics suitable for positive film by being superposed on the color balance filter 36N on the optical axis L. The color balance filter 36N is disposed on the optical axis in a fixed manner, and a filter group suitable for positive film can be formed by disposing the differential balance filter 36PS on the optical axis only when film images on a positive film or a black-and-white film are to be read. The color balance filter 36N shown in FIG. 8A corresponds to the particular (the one) optical filter in the fifth aspect of the present invention, and the differential color balance filter 36PS also shown in FIG. 8A corresponds to one of the remaining optical filters in the fifth aspect of the present invention.

Figure 8B:
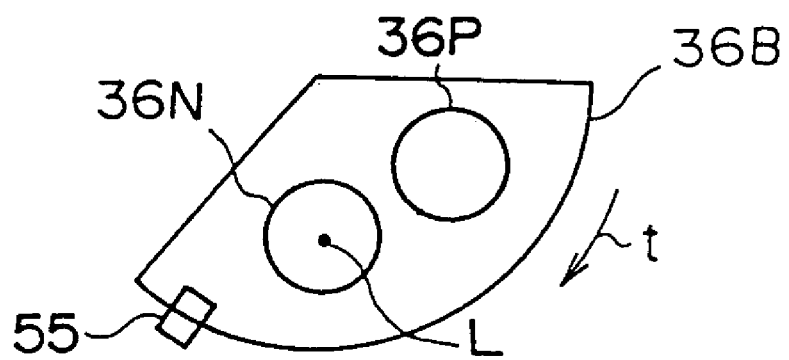
FIG. 8B is a plan view showing another configuration of the filter section according to the first embodiment.

Alternatively, as shown in FIG. 8B, a structure is possible in which the frame 36A is not provided and both the color balance filter 36N suitable for negative film and the color balance filter 36P suitable for positive film are fitted into the turret 36B, such that either the color balance filter 36N or the color balance filter 36P is disposed on the optical axis by driving to rotate the turret 36B in accordance with the type of the photographic film 22. The color balance filter 36N and the color balance filter 36P fitted into the turret 36B in FIG. 8B correspond to the plural types of the optical filters according to the fourth aspect of the present invention.

Second Embodiment

In the first embodiment, a case has been described in which the filter section 36 serving as the optical filter device of the present invention is disposed between the lamp 32 and the photographic film 22. In a second embodiment, a case will be described in which the filter section is disposed between the photographic film 22 and the linear CCD 116 and near the linear CCD 116.

First, the structure of an image reading apparatus 10' according to the present second embodiment will be described with reference to FIGS. 9 and 10. Components in the present second embodiment which are similar to those of the image reading apparatus 10 according to the first embodiment will be designated by the same reference numerals as those in FIGS. 3 and 4, and detailed description thereof will be omitted.

Figure 9:
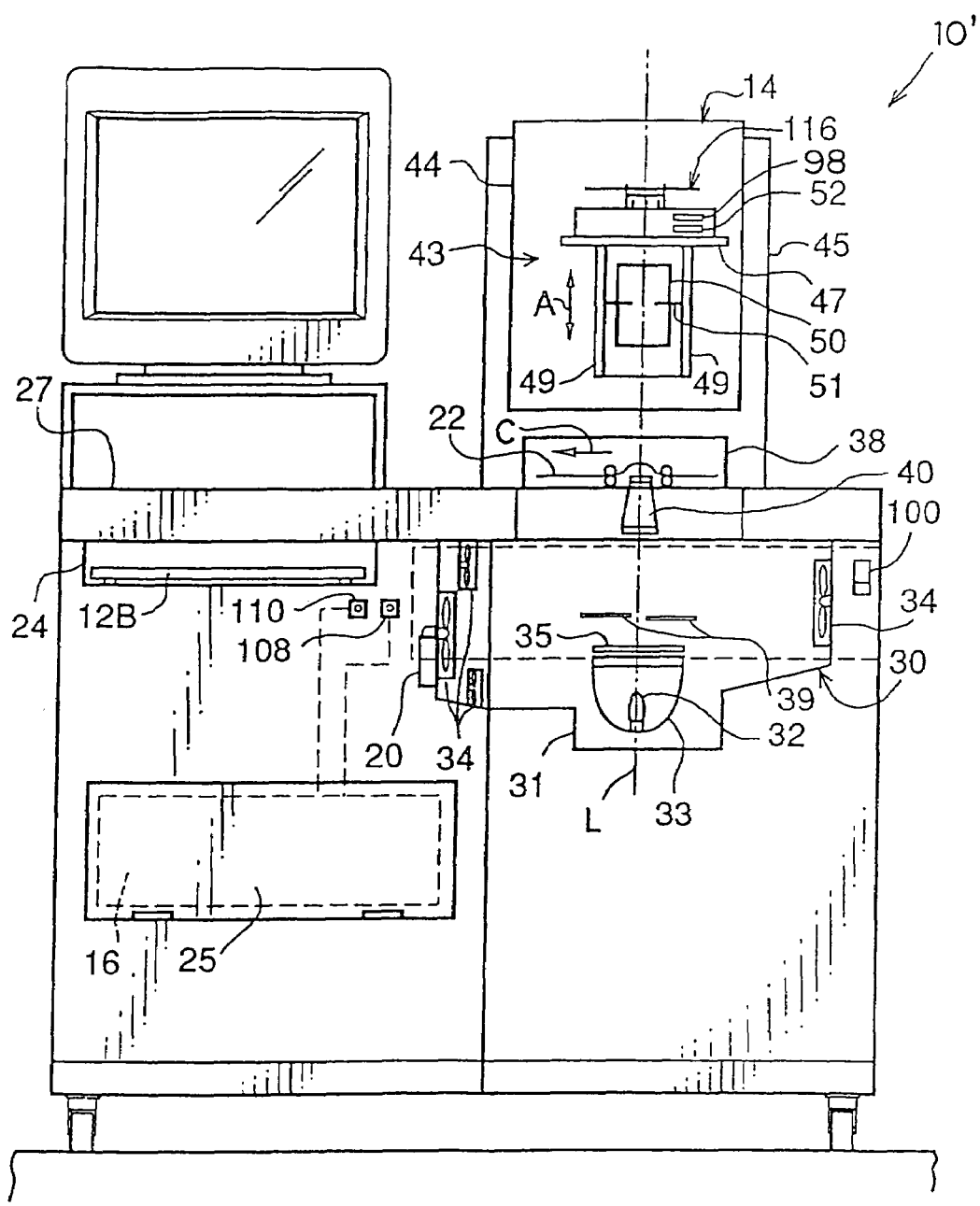
FIG. 9 is a front sectional view of an optical system of an image reading apparatus according to a second embodiment.
Figure 10:
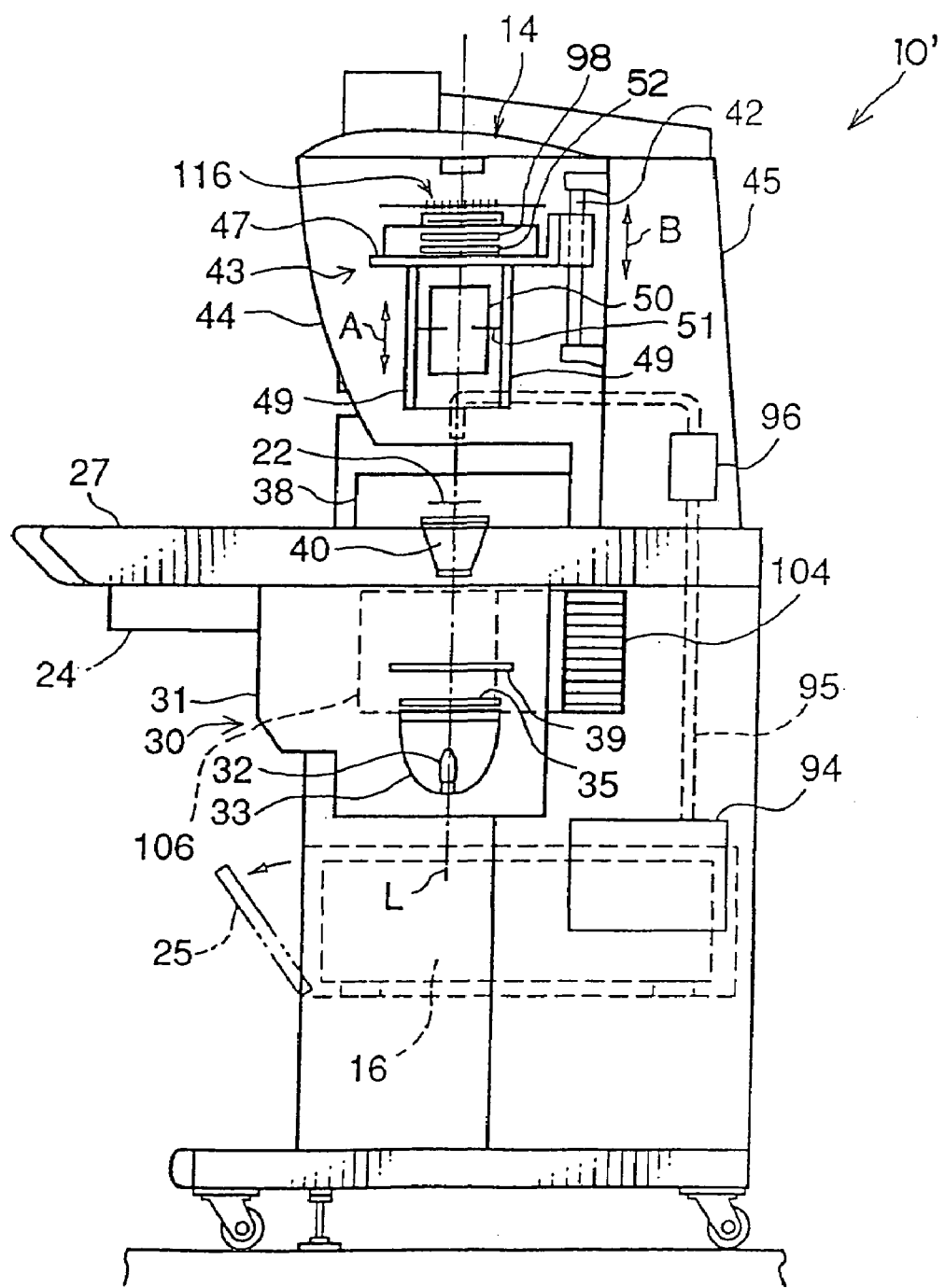
FIG. 10 is a side sectional view of the optical system of the image reading apparatus according to the second embodiment.

As shown in FIGS. 9 and 10, the image reading apparatus 10' according to the present second embodiment is different from the image reading apparatus 10 according to the first embodiment only in that the filter section 36 is replaced with a filter section 98 which is disposed on the optical axis and near the linear CCD 116.

Figure 11:
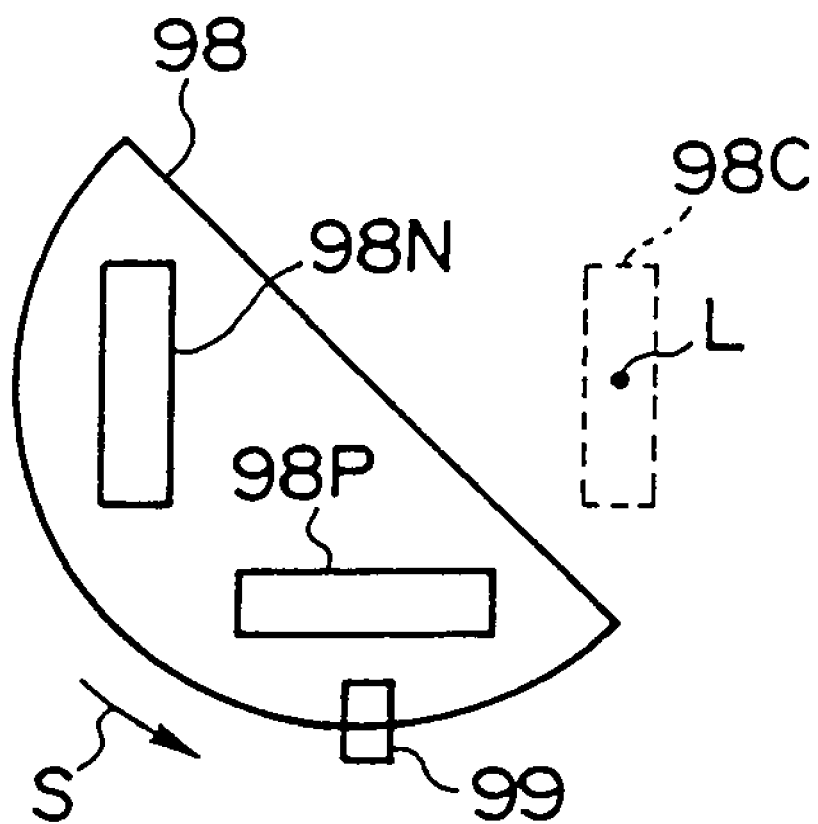
FIG. 11 is a plan view showing an example of the structure of a filter section according to the second embodiment.

As shown in FIG. 11, the filter section 98 has substantially the same shape and size as those of the CCD shutter 52. A color balance filter 98N corresponding to negative film and a color balance filter 98P corresponding to positive film are fitted into this filter section 98. The filter section 98 is rotated in a direction of arrow S in FIG. 11 so as to allow switching between a state in which the color balance filter 98N is positioned at a position 98C including the optical axis L when the filter characteristics suitable for negative film are formed, and a state in which the color balance filter 98P is positioned at the position 98C including the optical axis L when the filter characteristics suitable for positive film are formed.

As in the first embodiment, the filter characteristics suitable for negative film and the filter characteristics suitable for positive film in the present second embodiment are transmittance characteristics shown in FIGS. 16A and 17A, respectively.

Next, referring to FIG. 12, the schematic structure of an electric system of the linear CCD scanner 14 and the image processing section 16 according to the present second embodiment will be described. Components in FIG. 12 which are similar to those in FIG. 6 (the schematic structure of the electric system of the linear CCD scanner 14 and the image processing section 16 according to the first embodiment) will be designated by the same reference numerals as those in FIG. 6; and description thereof will be omitted.

As shown in FIG. 12, the structure of the electric system of the linear CCD scanner 14 and the image processing section 16 according to the present second embodiment is different from that of the first embodiment only in that the turret driving motor 54 and the turret position sensor 55 are replaced with a filter section driving motor 97 and a filter section position sensor 99, respectively.

The filter section driving motor 97 drives the filter section 98 to rotate in the direction of arrow S in FIG. 11 so that either the color balance filter 98N corresponding to negative film or the color balance filter 98P corresponding to positive film at the filter section 98 is positioned on the optical axis L. The filter section position sensor 99 detects the base position (an unillustrated notch) of the filter section 98.

The color balance filter 98N and the color balance filter 98P correspond to the plural types of the optical filters according to the fourth aspect of the present invention. Further, the filter section 98 corresponds to the optical filter device of the present invention.

Next, referring to the flowchart in FIG. 13, a processing for reading an image on the photographic film 22, which is carried out by the microprocessor 46 of the linear CCD scanner 14, will be described as the operation of the present second embodiment. Steps in FIG. 13 which are the same as those in FIG. 7 are designated by the same numerals, and description thereof will be omitted.

Figure 13:
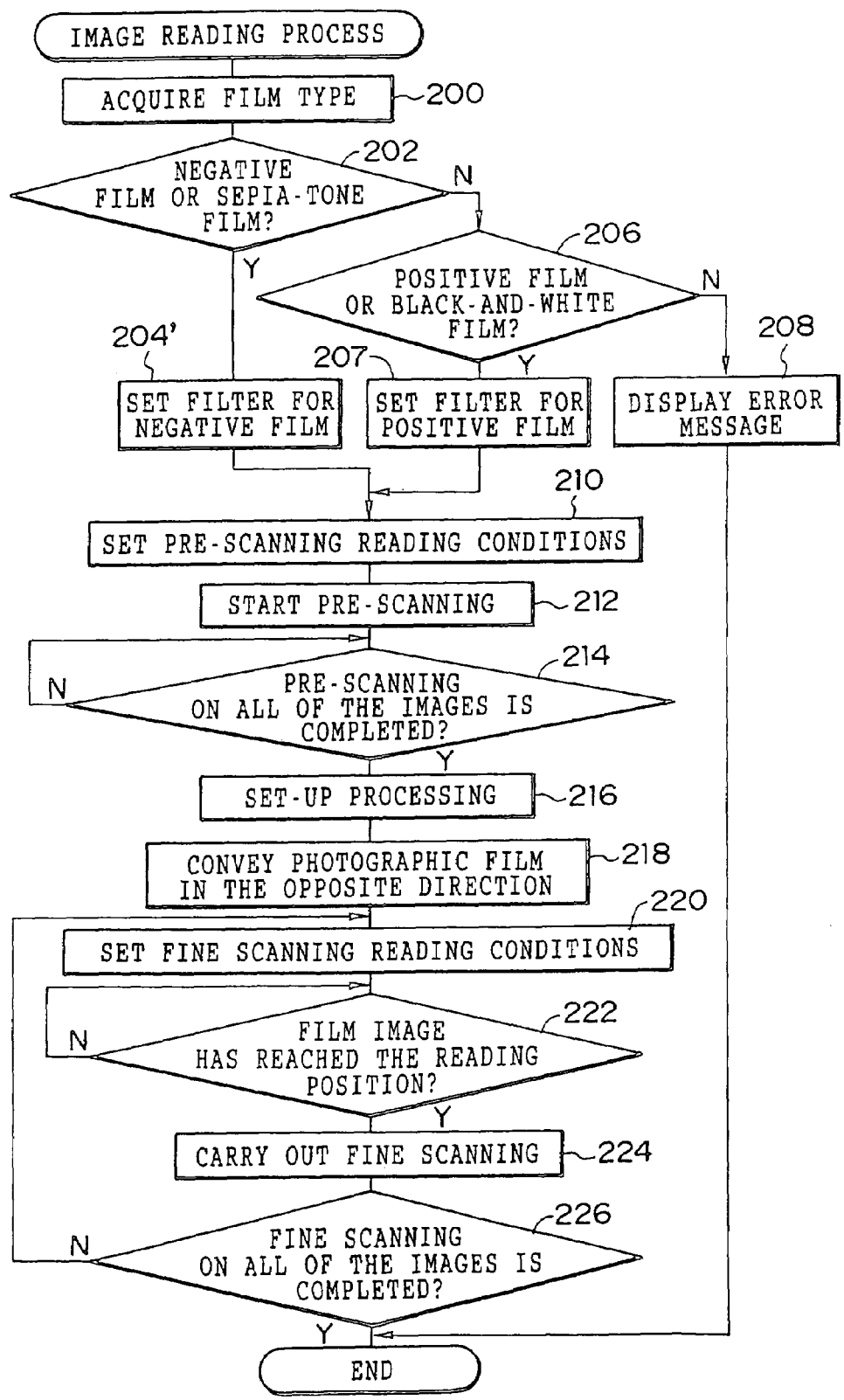
FIG. 13 is a schematic flowchart of an image reading processing executed by a microprocessor of the linear CCD scanner in the second embodiment.
Figure 14A:
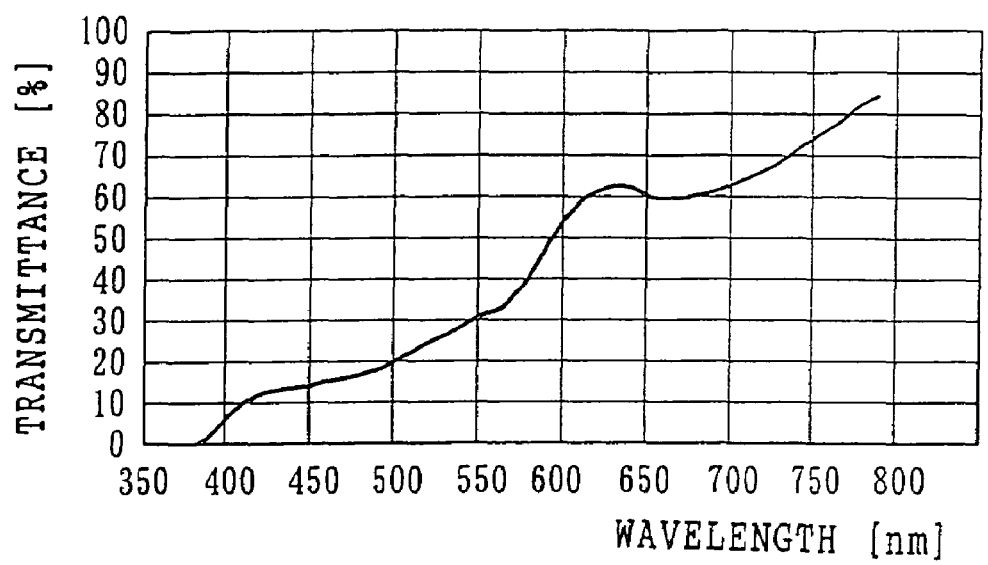
FIG. 14A is a graph showing an example of transmittance characteristics in a non-exposed portion of a negative film.
Figure 14B:
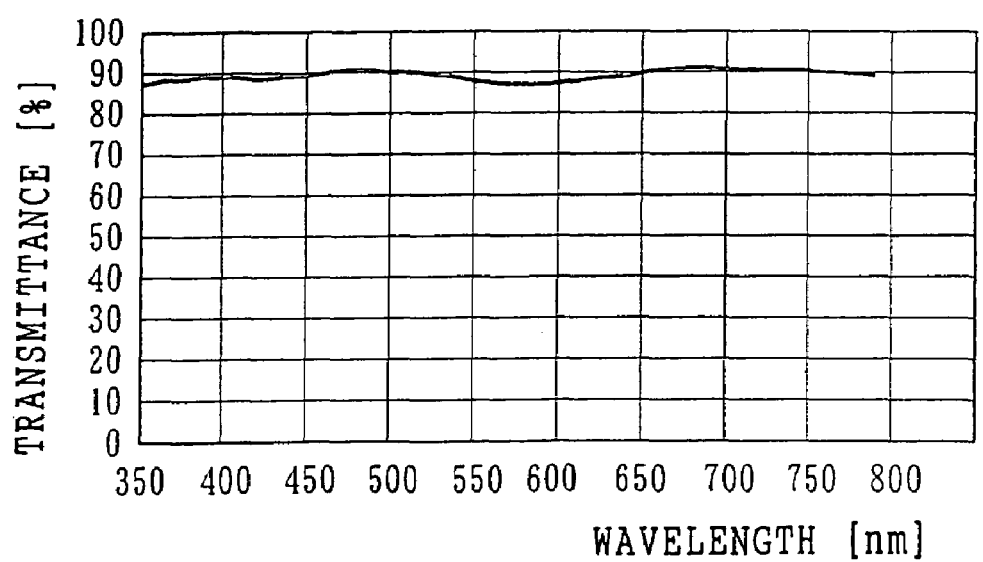
FIG. 14B is a graph showing an example of transmittance characteristics in a non-exposed portion of a positive film.

As shown in FIG. 13, in the image reading processing in the present second embodiment, the only points different from the image reading processing in the first embodiment are that step 204 is replaced with step 204' in which the color balance filter 98N for negative film is set, and step 207 is added in which the color balance filter 98P for positive film is set when the determination in step 206 is affirmative.

Namely, in the image reading processing in the present second embodiment, when the type of the photographic film 22 to be read is a negative film or a sepia-tone film, the filter section 98 is set so as to form the filter characteristics suitable for negative film by the filter section 98 being rotated to a position for a negative film (i.e., a position at which the center of the color balance filter 98N for negative film is positioned on the optical axis L) by the filter section driving motor 97. The process then proceeds to step 210.

On the other hand, when the type of the photographic film 22 to be read is a positive film or a black-and-white film, the filter section 98 is set so as to form the filter characteristics suitable for positive film by the filter section 98 being rotated to a position for a positive film (i.e., a position at which the center of the color balance filter 98P for positive film is positioned on the optical axis L) by the filter section driving motor 97. The process then proceeds to step 210.

As described above in detail, in the image reading apparatus according to the present second embodiment, the color balance of light made incident on the linear CCD 116 is adjusted in accordance with information which represents the type of the photographic film, in such a manner that by the filter section disposed between the photographic film and the linear CCD the color balance of transmitted light is adjusted so that the outputs for the respective colors from the linear CCD are substantially equal regardless of the type of the photographic film. Therefore, as in the image reading apparatus according to the first embodiment, complicated control such as setting an offset density for each type of the photographic film and adjusting the respective portions in accordance with the offset density is not necessary, and suitable adjustment of the color balance in accordance with the type of the photographic film can be easily carried out.

Further, in the image reading apparatus according to the present second embodiment, the filter section includes the color balance filter for adjusting the color balance when the photographic film is a negative film or a sepia-tone film, and the color balance filter for adjusting the color balance when the photographic film is a positive film or a black-and-white film. Namely, one filter is commonly used for photographic films having similar characteristics. Thus, compared with a case in which a filter is used for each type of the photographic film, the cost required for the apparatus can be reduced. Moreover, control for adjusting the color balance can be simplified.

Furthermore, in the image reading apparatus according to the present second embodiment, information representing the type of the photographic film is automatically acquired based on a DX code provided at the photographic film. Accordingly, labor can be saved as compared with a case in which the type of the photographic film is inputted by an operator or the like in the same way of the first embodiment.

Moreover, in the image reading apparatus according to the present second embodiment, the filter section is disposed between the photographic film and the linear CCD and near the linear CCD. Accordingly, the respective color balance filters can be made small. Further, since the respective color balance filters are disposed on a plate-like member (i.e., a turret), and either of the color balance filters is selected and used in accordance with information representing the type of the photographic film, the filters can be made small, thereby reducing costs and saving space.

In the above-described embodiments, a case has been described in which a DX code is used for acquiring information representing the type of the photographic film 22.

However, the present invention is not limited to the same. For example, when the photographic film is an APS film, information representing the type of the photographic film may be acquired by reading information representing the type of the photographic film, which information is stored in advance in a magnetic layer of the APS film. Information representing the type of the photographic film may be acquired by being inputted by an operator via the keyboards 12A and 12B, or the like. Alternatively, information representing the type of the photographic film may be acquired on the basis of image data of the non-exposed portion (the base of the film), which is obtained by pre-scanning.

In a case in which information representing the type of the photographic film is acquired on the basis of image data obtained by pre-scanning, for example, steps 200, 202, 204, 206 and 208 in the flowchart of FIG. 7 are carried out after pre-scanning, and then, information representing the type of the photographic film can be acquired on the basis of image data of the non-exposed portion obtained by pre-scanning.

In this case, a specific example of a method of acquiring the type of the photographic film is a method in which it is determined that the type of the photographic film is a negative film when the minimum values of the respective image data of R, G and B of the non-exposed portion obtained by pre-scanning increase in the order of B, G and R, and it is determined that the type of the photographic film is a positive film when the minimum values of the respective image data of R, G and B are substantially the same. In this case, the type of the photographic film can be specified even if the photographic film has no DX code. However, reliability deteriorates as compared with a case in which the type of the photographic film is inputted by an operator.

In the above-described embodiments, a case has been described in which the filter characteristics suitable for negative film and the filter characteristics suitable for positive film are the characteristics shown in FIGS. 16A and 17A, respectively. However, the present invention is not limited to the same. Any characteristics can be used as long as they enable adjustment of the color balance of illumination light emitted from the lamp 32 so that the outputs for the respective colors of the linear CCD 16 are substantially equal.

Further, in the above-described embodiments, a case has been described in which the linear CCD is used as an image sensor. However, the present invention is not limited to the same. An area CCD, or a photoelectric conversion element other than the CCD may be used.

Furthermore, in the above-described embodiments, a case has been described in which the first color correction state in which the photographic film is a negative film or a sepia-tone film, and the second color correction state in which the photographic film is a positive film or a black-and-white film, are used as the color correction states of the present invention. However, the present invention is not limited to this structure. In addition to these color correction states, various color correction states which correspond to the photographic films other than those films may be used. In this case, it is necessary to prepare optical filters which correspond to the respective color correction states, and therefore, the filter section may become large and the cost may increase. However, the number of the types of the photographic films which can be processed in the image reading apparatus of the present invention increases.

Moreover, in the above embodiments, a case has been described in which negative film and sepia-tone film belong to the same group, and positive film and black-and-white film belong to the same group. However, the present invention is not limited to the same. A different filter structure may be used for each type of the photographic film. In this case, it is necessary to prepare optical filters which correspond to the respective color correction states, and therefore, the filter section may become large and the cost may increase. However, since an optical filter which is optimum for the characteristics of each type of the photographic film can be used, the color balance can be accurately adjusted.

In accordance with the image reading apparatus of the first aspect, the color correction state of the color balance of light transmitted through the optical filter member is adjusted by the optical filter device, which is disposed between the light source and the image sensor, in accordance with information representing the type of the photographic material so that the outputs for the respective colors from the image sensor are substantially equal. Therefore, there can be obtained effects that complicated control such as setting an offset density for each type of the photographic film and carrying out, in accordance with the offset density, adjustment of the amount of insertion of the filter which adjusts light for reading, adjustment of the charge accumulation time by the CCD, and adjustment of the amplification factor with respect to an output from the CCD is not necessary, and suitable adjustment of the color balance in accordance with the type of the photographic film can be easily carried out.

Moreover, in accordance with the image reading apparatus of the second aspect, In the case of that the optical filter device sets color correction states which are different for the respective types of the photographic material to be read, it is possible that an optical color correction state which is optimum in accordance with the characteristics of each type of the photographic film can be set. In the case of that the photographic materials to be read which have the similar characteristics exist, and a common color correction state for the photographic materials to be read which have the similar characteristics is set, the number of the color correction states can be made less than the number of the types of the photographic material. Accordingly, comparing with a case in which each color correction state is set for each type of the photographic material, control for setting the color correction states can be simplified.

Further, in accordance with the image reading apparatus of the third and fourth aspects, effects similar to those of the invention of the first aspect can be obtained. Furthermore, the plural color correction states in the invention of the second aspect include the first color correction state in which the photographic material is a negative film or a sepia-tone film, and the second color correction state in which the photographic material is a positive film or a black-and-white film. Therefore, instead of each color correction state being set for each of the photographic materials, the same color correction state can be used for the photographic materials having similar characteristics. Accordingly, there can be obtained effects that, compared with a case in which a color correction state is set for each type of the photographic material, the cost required for the apparatus can be reduced, and control for adjusting the color balance can be simplified.

According to the image reading apparatus of the fifth aspect, effects similar to those of the invention of the second or third aspect can be obtained. Moreover, the particular color correction state among the plural color correction states is set by singly using the particular optical filter among the plural optical filters, and the particular optical filter among the plural optical filters and each of the remaining optical filters are used in combination such that each of the remaining color correction states, which corresponds to each of the remaining filters respectively combined with the particular optical filter, is set. Thus, there can be obtained an effect that control for adjustment of the color balance can be simplified by fixing the particular optical filter on the optical axis and, as occasion demands, disposing one of the remaining optical filters on the optical axis.

Further, according to the image reading apparatus of the sixth aspect, effects similar to those of the invention of the second or third aspect can be obtained. Further, each of the plural color correction states is set by using plural optical filters in combination. Accordingly, there can be obtained an effect that the number of the optical filters can be made less than the number of the color correction states. Moreover, effects can be obtained that the cost required for the apparatus can be reduced, and the optical filter device can be made small.

According to the image reading apparatus of the seventh aspect, effects similar to those of the invention of the first to sixth aspects can be obtained. Further, the optical filter device is disposed between the photographic material and the image sensor and in such a manner as to be close to the image sensor. Therefore, there can be obtained effects that the optical filter device can be made small, thereby reducing costs and saving space.

According to the image reading apparatus of the eighth aspect, effects similar to those of the invention of the first to sixth aspects can be obtained. Further, since the optical filter device is disposed between the light source and the photographic material, unnecessary light can be prevented from being irradiated onto the photographic material. As a result, there can be obtained an effect that generation of problems such as color fading or deterioration of the photographic material can be prevented.

According to the image reading apparatus of the ninth aspect, effects similar to those of the invention of any of the first to eighth aspects can be obtained. Moreover, information recorded on the photographic material is acquired by the acquiring device of the image reading apparatus in any of the first to eighth aspects, or information representing the type of the photographic material is acquired based on the results of the reading of the non-exposed portion of the photographic material by the image sensor (i.e., based on an output from the image sensor). Accordingly, there can be obtained effects that information can be automatically acquired, and labor can be saved as compared with a case in which information is inputted by an operator or the like.

According to the image reading method of the tenth aspect, the color balance of light incident on the image sensor is adjusted in accordance with the information representing the type of the photographic material, so that outputs for the respective colors from the image sensor, which reads an image recorded on the photographic material by dividing the image into plural pixels and separating the respective pixels into the plurality of colors, and outputs data of the plurality of colors, are substantially equal regardless of the type of the photographic material. Thus, as is the same in the invention of the first aspect, there can be obtained effects that complicated control such as setting an offset density for each type of the photographic material and carrying out, in accordance with the offset density, adjustment of the amount of insertion of the filter which adjusts light for reading, adjustment of the charge accumulation time by the CCD, and adjustment of the amplification factor with respect to an output from the CCD is not necessary, and suitable adjustment of the color balance in accordance with the type of the photographic material can be easily carried out.

What is claimed is:

1. An image reading apparatus comprising:
 a light source for emitting light which illuminates a photographic material;
 an image sensor which reads an image recorded on the photographic material by dividing the image into a plurality of pixels and separating each of the plurality of pixels into a plurality of colors, and outputs data of the plurality of colors;
 acquiring device for acquiring information representing a type of the photographic material; and
 an optical filter device which is disposed between said light source and said image sensor and sets a color correction state of a color balance of transmitted light in accordance with the information representing the type of the photographic material so that outputs for the plurality of colors from said image sensor are substantially equal.

2. The apparatus of claim 1, wherein said optical filter device sets plural color correction states in accordance with a characteristic of the photographic material.

3. The apparatus of claim 2, wherein the plural color correction states include a first color correction state corresponding to the photographic material which is one of a negative film or a sepia-tone film, and a second color correction state corresponding to the photographic material which is one of a positive film or a black-and-white film.

4. The apparatus of claim 2, wherein said optical filter device includes plural types of optical filters, and each of the plural color correction states is set by using respective optical filters.

5. The apparatus of claim 2, wherein said optical filter device includes plural types of optical filters, and a first color correction state among the plural color correction states is set by using a first optical filter among the plural types of optical filters and each of the other color correction states is set by using the first optical filter and respective other optical filters among the plural types of optical filters in combination.

6. The apparatus of claim 2, wherein said optical filter device includes plural types of optical filters and sets each of the plural color correction states by using plural optical filters among the plural types of optical filters in combination.

7. The apparatus of claim 1, wherein said optical filter device is disposed between the photographic material and said image sensor and is disposed in the vicinity of said image sensor.

8. The apparatus of claim 1, wherein said optical filter device is disposed between said light source and the photographic material.

9. The apparatus of claim 1, wherein said acquiring device acquires the information representing the type of the photographic material based on one of information recorded on the photographic material and the results of reading of a non-exposed portion of the photographic material by said image sensor.

* * * * *